US012687617B2

(12) United States Patent
Onda et al.

(10) Patent No.: US 12,687,617 B2
(45) Date of Patent: Jul. 21, 2026

(54) OPTICAL DETECTOR

(71) Applicant: DENSO CORPORATION, Kariya-city (JP)

(72) Inventors: Kazuhisa Onda, Kariya-city (JP); Teiyuu Kimura, Kariya-city (JP); Mitsuhiro Kiyono, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 1034 days.

(21) Appl. No.: 17/814,423

(22) Filed: Jul. 22, 2022

(65) Prior Publication Data

US 2022/0365178 A1 Nov. 17, 2022

Related U.S. Application Data

(63) Continuation of application No. PCT/JP2021/002583, filed on Jan. 26, 2021.

(30) Foreign Application Priority Data

Jan. 31, 2020 (JP) ................................. 2020-015009
Jan. 21, 2021 (JP) ................................. 2021-008130

(51) Int. Cl.
*G01S 7/481* (2006.01)
*G02B 7/02* (2021.01)
(Continued)

(52) U.S. Cl.
CPC ............ *G01S 7/4816* (2013.01); *G02B 7/028* (2013.01); *G02B 9/18* (2013.01); *G02B 13/18* (2013.01);
(Continued)

(58) Field of Classification Search
None
See application file for complete search history.

(56) References Cited

U.S. PATENT DOCUMENTS 9,470,520 B2 10/2016 Schwarz et al.
10,063,849 B2 8/2018 Pacala et al.
(Continued)

FOREIGN PATENT DOCUMENTS

JP H02-154463 A 6/1990
JP 2010-151958 A 7/2010
(Continued)

*Primary Examiner* — Luke D Ratcliffe
(74) *Attorney, Agent, or Firm* — Precision Patents, P.C.

(57) ABSTRACT

An optical detector includes a light emitting unit and a light receiving unit that receives a reflected light reflected by a measurement object. The light receiving unit has a detection element and a condenser lens system that collects the reflected light to the detection element. The condenser lens system has a plurality of lenses. The condenser lens system has a temperature change factor that increases the optical power at a high temperature than at a low temperature, and a chromatic aberration factor that decreases the optical power at a long wavelength than at a short wavelength. The optical power of each of the plurality of lenses is adjusted based on a correspondence between a change in temperature and a shift amount of the peak wavelength, so that the chromatic aberration factor balances with the temperature change factor within a predetermined wavelength range.

15 Claims, 11 Drawing Sheets

(51) Int. Cl.
 G02B 9/18 (2006.01)
 G02B 13/18 (2006.01)
 G02B 19/00 (2006.01)

(52) U.S. Cl.
 CPC ..... G02B 19/0014 (2013.01); G02B 19/0076
 (2013.01)

(56) References Cited

U.S. PATENT DOCUMENTS

| | | |
|---|---|---|
| 2004/0189786 A1 | 9/2004 | Yamakawa |
| 2015/0168692 A1* | 6/2015 | Kitahara ........... G02B 13/0045 |
| | | 359/752 |
| 2018/0094793 A1 | 4/2018 | Yokota et al. |
| 2019/0011556 A1 | 1/2019 | Pacala et al. |
| 2019/0011561 A1 | 1/2019 | Pacala et al. |
| 2019/0011562 A1 | 1/2019 | Pacala et al. |
| 2019/0011567 A1 | 1/2019 | Pacala et al. |
| 2019/0064355 A1 | 2/2019 | Pacala et al. |
| 2019/0179028 A1* | 6/2019 | Pacala .................. H05K 1/0274 |
| 2020/0041646 A1 | 2/2020 | Pacala et al. |
| 2021/0318434 A1 | 10/2021 | Pacala et al. |

FOREIGN PATENT DOCUMENTS

| | | |
|---|---|---|
| JP | 2012-229988 A | 11/2012 |
| JP | 2013-231746 A | 11/2013 |

* cited by examiner 21, 22

11 (31)

23

33   34

35
35

PT 35   35

OPTICAL DETECTOR

CROSS REFERENCE TO RELATED APPLICATION

The present application is a continuation application of International Patent Application No. PCT/JP2021/002583 filed on Jan. 26, 2021, which designated the U.S. and claims the benefit of priority from Japanese Patent Application No. 2020-015009 filed on Jan. 31, 2020 and Japanese Patent Application No. 2021-008130 filed on Jan. 21, 2021. The entire disclosures of all of the above applications are incorporated herein by reference.

TECHNICAL FIELD

The present disclosure relates to an optical detector.

BACKGROUND

An optical detector includes an optical lens that collects reflected light to a detection element, when a laser light emitted by a light emitting unit is reflected by a measurement object.

SUMMARY

According to an aspect of the present disclosure, an optical detector includes: a light emitting unit that emits laser light having temperature dependence on a peak wavelength to shift to a longer wavelength side as a temperature rises; and a light receiving unit that receives a reflected light which is the laser light reflected by a measurement object. The light receiving unit has a detection element that detects the reflected light, and a condenser lens system that collects the reflected light to the detection element. The condenser lens system has a plurality of lenses made of optical material and having a positive optical power as a whole. The condenser lens system has a temperature change factor in the optical material that increases the optical power as a whole of the lens system at a high temperature than at a low temperature lower than the high temperature with respect to the reflected light, and a chromatic aberration factor that decreases the optical power as a whole of the lens system at a long wavelength than at a short wavelength shorter than the long wavelength with respect to the reflected light. The optical power of each of the plurality of lenses is adjusted based on a correspondence between a change in temperature and a shift amount of the peak wavelength, so that the chromatic aberration factor balances with the temperature change factor within a wavelength range where the shift in the peak wavelength is assumed.

DESCRIPTION OF EMBODIMENT

Figure 1:
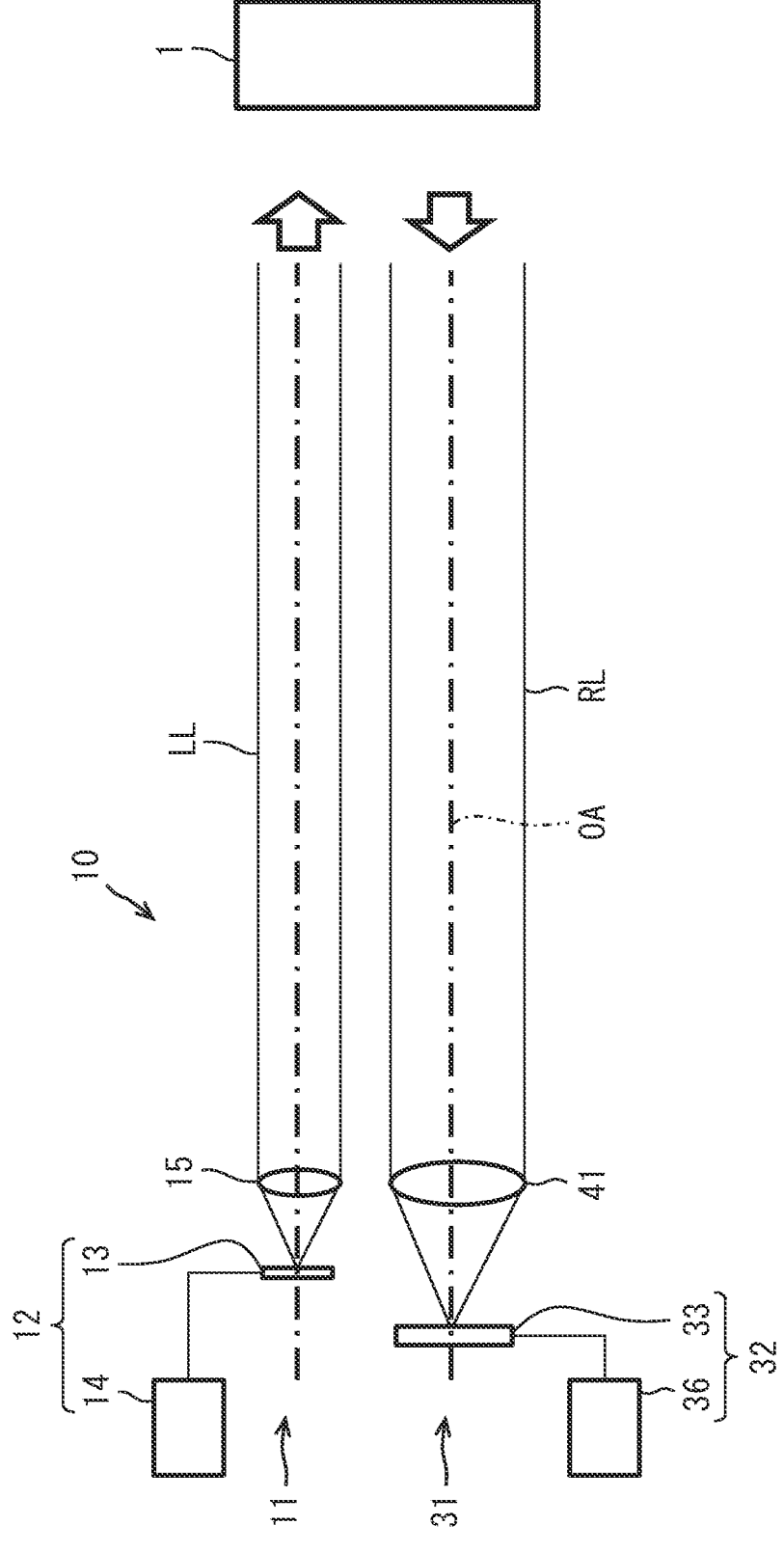
FIG. 1 is a diagram illustrating an optical detector according to a first embodiment.

To begin with, examples of relevant techniques will be described.
An optical detector includes one optical lens that collects reflected light to a detection element, when a laser light emitted by a light emitting unit is reflected by a measurement object.
In case where the optical detector is used in an environment where the temperature changes, if the peak wavelength of the laser light to be reflected has temperature dependence, the peak wavelength of the reflected light is shifted in response the change in temperature. Since chromatic aberration can hardly be adjusted, the optical power fluctuates when the peak wavelength is shifted. Since the fluctuation in optical power affects the light collection state on the detection element, there is a concern that high detection performance cannot be maintained against the change in temperature.
The present disclosure provides an optical detector capable of maintaining high detection performance.
According to an aspect of the present disclosure, an optical detector includes: a light emitting unit that emits laser light having temperature dependence on a peak wavelength to shift to a longer wavelength side as a temperature rises; and a light receiving unit that receives a reflected light which is the laser light reflected by a measurement object. The light receiving unit has a detection element that detects the reflected light, and a condenser lens system that collects the reflected light to the detection element. The condenser lens system has a plurality of lenses made of optical material and having a positive optical power as a whole. The condenser lens system has a temperature change factor in the optical material that increases the optical power as a whole of the lens system at a high temperature than at a low temperature lower than the high temperature with respect to the reflected light, and a chromatic aberration factor that decreases the optical power as a whole of the lens system at a long wavelength than at a short wavelength shorter than the long wavelength with respect to the reflected light. The optical power of each of the plurality of lenses is adjusted based on a correspondence between a change in temperature and a shift amount of the peak wavelength, so that the chromatic aberration factor balances with the temperature change factor within a wavelength range where the shift in the peak wavelength is assumed.

In this aspect, the peak wavelength of a laser light, which is the source of the reflected light, has the temperature dependence. The optical power of the entire lens system is affected to increase by the temperature change factor caused in the optical material, in response to change in temperature of the environment, in the condenser lens system. The change in temperature causes a shift in the peak wavelength of the reflected light. Therefore, the optical power of the entire lens system is decreased with respect to the reflected light by the chromatic aberration factor caused by the chromatic aberration of the condenser lens system. The distribution of the optical power among the plurality of lenses in the condenser lens system is set so that the chromatic aberration factor is balanced with the temperature change factor within the wavelength range in which the shift in peak wavelength is expected.

That is, the chromatic aberration is set based on the correspondence between the change in temperature and the shift in the peak wavelength, to shift the focal point backward at a long wavelength, so as to cancel the forward shift of the focal point caused by the optical material. Therefore, the light condensed state can be maintained even with respect to change in temperature to focus at the detection element. Since the reflected light can be efficiently collected on the detection element, the sensitivity of the detection element to detect the reflected light can be raised. Thus, the detection performance can be maintained as high.

According to another aspect, an optical detector includes: a light emitting unit that emits laser light having temperature dependence on a peak wavelength to shift to a longer wavelength side as a temperature rises; and a light receiving unit that receives a reflected light which is the laser light reflected by a measurement object. The light receiving unit has a detection element that detects the reflected light, and a condenser lens system that collects the reflected light to the detection element. The condenser lens system has a plurality of lenses made of optical material and having a positive optical power as a whole. The condenser lens system has a first lens group including at least one positive lens of the plurality of lenses, and a second lens group including at least one negative lens, which is a part of the plurality of lenses excluding the lens belonging to the first lens group. The optical material that forms the negative lens has dispersion characteristic that is higher in dispersion than the optical material that forms the positive lens. The optical material that forms the negative lens has temperature dependence in refractive index in which a derivative of the refractive index with respect to the temperature is larger than the optical material that forms the positive lens.

Accordingly, the optical material forming the negative lens has dispersion characteristic which is higher in dispersion than the optical material forming the positive lens. Further, the optical material forming the negative lens has temperature dependence in the refractive index, in which the refractive index differentiated by the temperature is higher than that of the optical material forming the positive lens. Thus, the action of moving the focus is weakened when the temperature rises. In detail, the action of moving the focus to the front side due to the temperature dependence of the optical material in the refractive index is weakened, and the action of moving the focus to the rear side due to the dispersion characteristics of the optical material is weakened. Therefore, it is possible to avoid a situation in which the reflected light to be detected is largely defocused with respect to the detection element.

That is, it is possible to easily maintain a light condensed state in which the detection element is focused even when the temperature changes. Since the reflected light can be efficiently collected on the detection element, the sensitivity of the detection element to detect the reflected light can be raised. Thus, the detection performance can be maintained as high.

According to another aspect, an optical detector includes: a light emitting unit that emits laser light having temperature dependence on a peak wavelength to shift to a longer wavelength side as a temperature rises; and a light receiving unit that receives a reflected light which is the laser light reflected by a measurement object. The light emitting unit includes a laser emitting element that emits the laser light, and a projecting lens system to project the laser light to a measurement object. The projecting lens system has a plurality of lenses formed of an optical material and has a positive optical power as an entire lens system. The projecting lens system has a factor to change the optical power of the entire lens system with respect to the laser light, such as a temperature change factor of the optical material that increases the optical power of the entire lens system at a high temperature compared to a low temperature, and a chromatic aberration factor that decreases the power of the entire lens system at a long wavelength compared to a short wavelength. The optical power is distributed among the lenses based on a correspondence between the amount of temperature change and the amount of shift in the peak wavelength so that the chromatic aberration factor balances with the temperature change factor in the wavelength range where the shift of the peak wavelength is expected.

Accordingly, in the projecting lens system, the optical power of the entire lens system fluctuates in a direction of increasing due to the temperature change factor caused by the optical material as the temperature of the environment changes. Along with this temperature change, the laser light has a temperature dependence. Therefore, the peak wavelength of the laser light also shifts, and the optical power of the entire lens system fluctuates in a direction of decreasing relative to the laser light due to the chromatic aberration factor caused by the chromatic aberration of the projecting lens system. The distribution of the optical power among the plurality of lenses of the projecting lens system is set so that the chromatic aberration factor is balanced with the temperature change factor in the assumption range of the wavelength fluctuation where the shift in peak wavelength is assumed.

That is, the chromatic aberration that shifts the long wavelength to the front side is set to cancel the shift of the focal point to the rear side due to the optical material, based on the correspondence between the amount of temperature change and the amount of shift in the peak wavelength. Therefore, the state in which the laser emitting element is in focus is maintained even with respect to the temperature change. Since the intended spot shape of the projected laser light can be maintained, the light can be effectively projected to the measurement object. Therefore, the performance of detecting the measurement object by the reflected light reflected by the measurement object can be maintained in a high state.

It should be noted that the reference numerals are merely illustrative of the correspondence with the portions of the embodiments described below, and are not intended to limit the technical scope.

Hereinafter, multiple embodiments will be described with reference to the drawings. It should be noted that the same reference numerals are assigned to the corresponding components respectively in the respective embodiments, so that duplicative descriptions may be omitted. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined even if they are not explicitly shown if there is no problem in the combinations in particular.

First Embodiment

As shown in FIG. 1, an optical detector 10 according to a first embodiment of the present disclosure is a LiDAR (Light Detection and Ranging/Laser Imaging Detection and Ranging) to be mounted on a vehicle as a mobile unit. The optical detector 10 is used in an environment in which the temperature changes. For example, the optical detector 10 is arranged on the side surface of the vehicle or on the roof of the vehicle. The optical detector 10 projects a laser light LL within a predetermined measurement region in the periphery of the vehicle, and the laser light LL is reflected by a measurement object 1. The optical detector 10 can measure the measurement object 1 due to the reflected light RL. The measurement of the measurement object 1 is, for example, measurement of the direction in which the measurement object 1 exists, measurement of the distance from the optical detector 10 to the measurement object 1, and the like.

Figure 2:
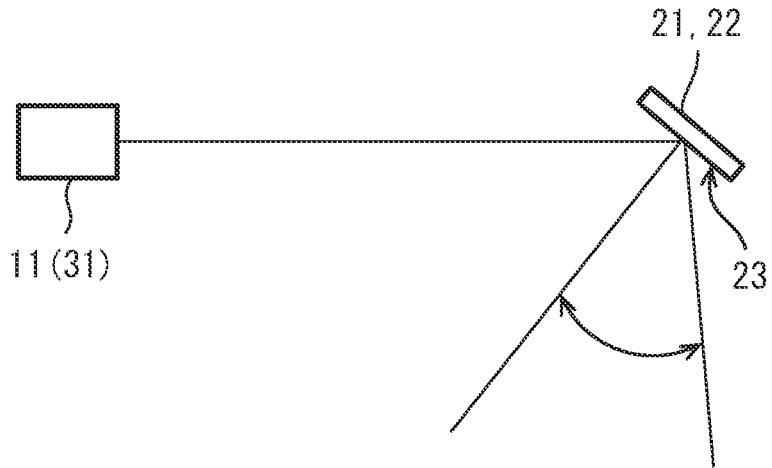
FIG. 2 is a diagram illustrating a relationship between a light emitting unit, a light receiving unit and a scanning unit.

As shown in FIGS. 1 and 2, the optical detector 10 has a light emitting unit 11, a scanning unit 21, and a light receiving unit 31. The light emitting unit 11 emits the laser light LL toward the scanning unit 21. The light emitting unit 11 includes a light emitting element unit 12 and a light projecting lens system 15.

The light emitting element unit 12 includes, for example, a laser emitting element 13 and a light emitting control unit 14. The laser emitting element 13 of this embodiment is, for example, a laser diode (LD). The laser emitting element 13 has a row array of light emitting sources arranged in a predetermined one direction on a substrate. The laser emitting element 13 can oscillate a laser light LL as coherent light by a laser process using a Fabry-Perot resonator structure. The laser emitting element 13 emits a pulsed laser light LL at a timing corresponding to an electric signal from the light emitting control unit 14 which is an electronic circuit for controlling the laser emitting element 13. The laser light LL is, for example, a monochromatic laser light having one peak wavelength in the near infrared region, which is difficult to see by an occupant of the vehicle (humans such as driver). The value of the peak wavelength at ambient temperature (for example, 20° C.) is, for example, 905 nm. Hereinafter 905 nm is referred to as reference wavelength.

The peak wavelength of the laser light LL has a temperature dependence such that it gradually shifts from the short wavelength side to the long wavelength side as the temperature increases. The peak wavelength can fluctuate within a wavelength fluctuation expected range (for example, 885 to 940 nm) according to a temperature change assumption range (for example, −40 to 125° C.) assumed as the vehicle-mounted environment. In this embodiment, the light induced and emitted by the laser emitting element 13 is amplified by the Fabry-Perot resonator structure. The peak wavelength substantially increases linearly in response to an increase in temperature. That is, in the temperature change assumption range, the value of the first derivative of the peak wavelength with respect to temperature derivative can be regarded as being positive and a fixed value.

The projecting lens system 15 is arranged between the laser emitting element 13 and the mirror 22 of the scanning unit 21. The projecting lens system 15 has one lens or a configuration in which plural lenses are combined, and has a positive optical power. The projecting lens system 15 refracts each laser light LL emitted individually by each laser emission element 13. The projecting lens system 15 combines and shapes the laser lights LL into a beam having a line-shaped spot form.

The scanning unit 21 includes a movable optical member commonly or separately provided between the light emitting unit 11 and the light receiving unit 31. The movable optical member is, for example, the mirror 22. The mirror 22 has the reflecting surface 23 to reflect the laser light LL emitted from the projecting lens system 15 toward the outside of the optical detector 10. The orientation of the reflecting surface 23 is changed with time. The change in the orientation of the reflecting surface 23 can be realized by a rotational motion or a reciprocating motion of the mirror 22. The laser light LL is timely scanned within the measurement region around the vehicle by changing the orientation of the reflecting surface 23 with time.

When the scanned laser light LL is reflected by the measurement object 1 located in the measurement region, a part of the reflected light RL returns into the optical detector 10. When the optical detector 10 is applied to a vehicle, a typical measurement object 1 is a pedestrian, a cyclist, an animal other than the human, a moving object such as another vehicle, and a stationary object such as a guard rail, a road sign, a road frame structure, or the like.

The light receiving unit 31 receives the reflected light RL after passing through the scanning unit 21. The light receiving unit 31 includes a detection element unit 32 and a condenser lens system 41.

The detection element unit 32 includes, for example, a detection element 33 and a light receiving control unit 36. The detection element 33 may be various photodiodes, various photoconducting cells, photomultiplier tubes and the like. In the present embodiment, the detection element 33 is made of a single photon avalanche diode (hereinafter referred to as SPAD). SPAD has a characteristic that a short pulse-shaped reflected light RL can be detected with high sensitivity.

Figure 3:
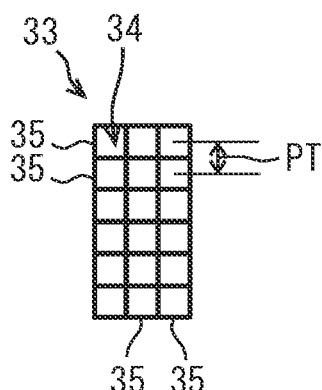
FIG. 3 is a front view illustrating a detection surface.

As shown in FIG. 3, the detection element 33 has plural pixels 35 arranged in an array on the substrate due to the array of SPAD. The pixels 35 are arranged in a predetermined one-dimensional direction or two-dimensional direction at a predetermined arrangement interval PT. A planar region on the surface of the substrate in which the pixels 35 are arranged is defined as a detection surface 34.

As shown in FIG. 1, the light receiving control unit 36 is an electronic circuit that controls the detection element 33 based on a specific light receiving timing linked with the light emitting timing of the light emitting control unit 14. Specifically, each of the pixels 35 in the detection element 33 is controlled with an electronic shutter. The detection element unit 32 can measure the light receiving timing and intensity of the reflected light RL by a voltage value input into the light receiving control unit 36 based on the reflected light RL.

Figure 4:
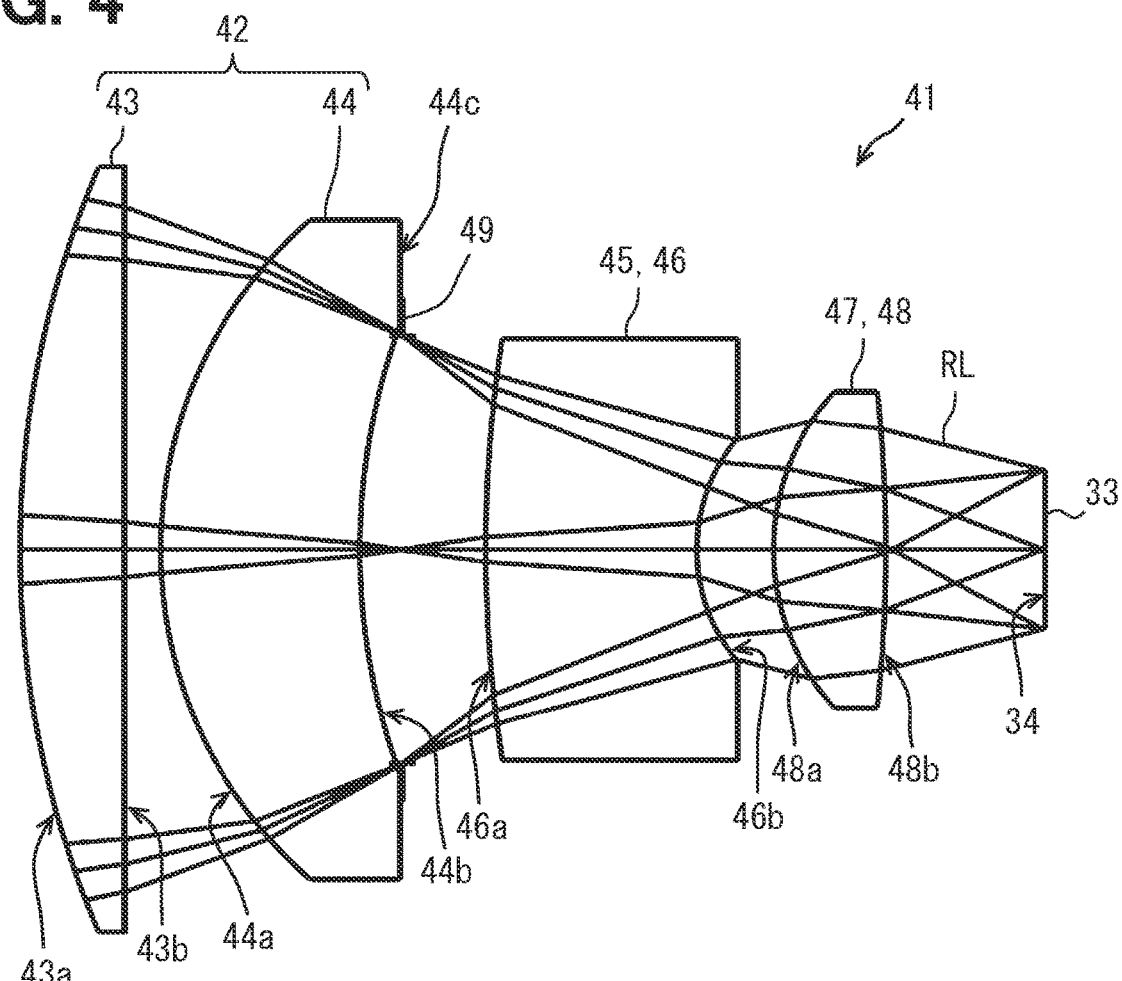
FIG. 4 is a diagram illustrating an optical path of a condenser lens system.

The condenser lens system 41 is arranged between the detection element 33 and the mirror 22 of the scanning unit 21. The condenser lens system 41 includes a combination of lenses 43, 44, 46, 48. The combined optical power of the plural lenses 43, 44, 46, 48 constituting the condenser lens system 41 is positive. That is, the optical power of the entire lens system is positive. The condenser lens system 41 refracts the reflected light RL incident through the mirror 22 and condenses the reflected light RL on the detection element 33. As shown in FIG. 4, the condenser lens system 41 has a function of forming an image of the reflected light RL so as to be focused on the detection surface 34 of the detection element 33. Specifically, an image of the reflected light RL has the rear focal point on the detection surface 34 of the detection element 33, due to the condenser lens system 41. The condenser lens system 41 is an optical system that is athermalized within the above-mentioned temperature change assumption range.

The condenser lens system 41 includes a front lens group 42, a middle lens group 45, and a rear lens group 47. The front lens group 42 is arranged at a position the farthest from the detection element 33 among the lens groups 42, 45, 47. The middle lens group 45 is arranged between the front lens group 42 and the detection element 33. Specifically, the middle lens group 45 is arranged between the front lens group 42 and the rear lens group 47. The rear lens group 47 is arranged at a position the closest to the detection element 33 among the lens groups 42, 45, 47. The optical power of the entire lens system described above is the combined optical power of the front lens group 42, the middle lens group 45, and the rear lens group 47.

In the following, the incident side where the reflected light RL from the measurement object 1 is incident in the condenser lens system 41 is described as the front side. Further, the emit side where the reflected light RL is emitted toward the detection element 33 in the condenser lens system 41 is referred to as the rear side. That is, in the condenser lens system 41, the front lens group 42 is arranged on the frontmost side, and the rear lens group 47 is arranged on the rearmost side.

Each of the lens groups 42, 45, 47 includes at least one lens 43, 44, 46, 48. In the present embodiment, the front lens group 42 is composed of two lenses 43 and 44. The middle lens group 45 is composed of one lens 46, and the rear lens group 47 is composed of one lens 48. That is, the condenser lens system 41 of the present embodiment has a lens configuration of four lenses in three groups. The virtual axis connecting the vertices of the lenses 43, 44, 46, 48 is defined as the optical axis OA of the condenser lens system 41 in the present embodiment.

The details of the lens groups 42, 45, 47 will be described below. The front lens group 42 is composed of two positive lenses 43 and 44 having positive optical power. Therefore, the front lens group 42 has positive optical power as a whole. The two positive lenses 43 and 44 of the present embodiment are made of the same optical material. The optical material forming the two positive lenses 43 and 44 has normal dispersion characteristics, and may be made of, for example, a crown-type glass material. Hereinafter, in the optical material forming the two positive lenses 43 and 44, the refractive index for the d-line (specifically, 587.56 nm) using helium as the excitation medium is defined as na, an Abbe number based on the d-line is defined as va, and a value (first derivative) calculated by differentiating the refractive index with temperature is described as dna/dt.

The optical material may be exposed from the refracting surfaces 43a, 43b, 44a, 44b of the lenses 43, 44, or a functional coating such as an antireflection coating may be provided on the refracting surfaces 43a, 43b, 44a, 44b of the lenses 43, 44. When the optical material is exposed, the refracting surfaces 43a, 43b, 44a, 44b may be formed smoothly by polishing or the like, or may be provided with a moth-eye structure or the like. The alternative configuration in the refracting surfaces can be applied in the same manner for the refracting surfaces 46a, 46b, 48a, 48b of the middle lens group 45 and the rear lens group 47.

The positive lens 43 located on the front side of the front lens group 42 is formed in a plano-convex lens shape in which the front refracting surface 43a is convex and the rear refracting surface 43b is flat (or slightly curved concave). The positive lens 44 located on the rear side of the positive lens 43 is formed in a convex meniscus lens shape having positive optical power, in which the front refracting surface 44a has a convex shape and the rear refracting surface 44b has a concave shape.

The convex or concave refracting surface, that is, the refracting surfaces 43a, 43b, 44a, 44b having optical power may be formed in a spherical shape or may be formed in a rotationally symmetric aspherical shape having rotational invariance. The refracting surfaces 43a, 43b, 44a, 44b may be formed in a toroidal surface shape while the function of the condenser lens system 41 can be realized. For example, each of the refracting surfaces 43a, 43b, 44a, 44b of the present embodiment is formed in a spherical shape. The alternative configuration of the refracting surfaces can be applied in the same manner for the refracting surfaces 46a, 46b, 48a, 48b of the middle lens group 45 and the rear lens group 47.

The radius of curvature of the front refracting surface 43a of the positive lens 43 is sufficiently smaller than the radius of curvature on the rear refracting surface 43b. The radius of curvature of the front refracting surface 44a of the positive lens 44 is smaller than the radius of curvature on the rear refracting surface 44b.

Further, the radius of curvature of the front refracting surface 44a of the positive lens 44 is smaller than the radius of curvature of the front refracting surface 43a of the positive lens 43, and smaller than the radius of curvature of the rear refracting surface 44b. The radius of curvature of the rear refracting surface 44b of the positive lens 44 is smaller than the radius of curvature of the front refracting surface 43a of the positive lens 43 and smaller than the radius of curvature of the rear refracting surface 43b. When comparing the magnitude of the radius of curvature, the radius of curvature is treated as infinite when the refracting surface is flat. Further, the optical power of the positive lens 43 is smaller than the optical power of the positive lens 44.

The thickness of the positive lens 44 at the center is larger than the thickness of the positive lens 43 at the center. The apex of the rear refracting surface 43b of the positive lens 43 and the apex of the front refracting surface 44a of the positive lens 44 are separated by a distance smaller than the center thickness of the positive lens 43 and smaller than the center thickness of the positive lens 44.

The effective diameter of the rear refracting surface 44b of the positive lens 44 is smaller than the effective diameter of the front refracting surface 44a of the positive lens 44, smaller than the effective diameter of the refracting surface 43b of the positive lens 43, and smaller than the effective diameter of the refracting surface 43a. The positive lens 44 has a flat surface portion 44c along the direction perpendicular to the optical axis OA so as to surround the entire circumference of the rear refracting surface 44b from the outer peripheral side, outside the range of the effective diameter. A diaphragm 49 having a diameter slightly smaller than the effective diameter of the refracting surface 44b is provided at a position on the rear side of the rear refracting surface 44b of the positive lens 44 and close to the refracting surface 44b and the flat surface portion 44c. The effective diameter of the condenser lens system 41 represents a height (so-called light ray height) with respect to the optical axis OA when the light ray, which connects the end of the detection surface 34 to the open end of the diaphragm 49, passes through the target refracting surface.

The middle lens group 45 is composed of one negative lens 46 having negative optical power. Therefore, the middle lens group 45 has a negative optical power as a whole. The optical material forming the negative lens 46 has normal dispersion characteristics and is made of, for example, a flint-based glass material. In the optical material forming the negative lens 46, the refractive index with respect to the d-line is described as nb, the Abbe number with respect to the d-line is described as vb, and the value (first derivative) calculated by differentiating the refractive index by temperature is described as dnb/dt.

The negative lens 46 is formed in a concave meniscus lens shape having a negative optical power, in which the front refracting surface 46a has a convex shape and the rear refracting surface 46b has a concave shape. The radius of curvature of the front refracting surface 46a of the negative lens 46 is larger than the radius of curvature on the rear refracting surface 46b. The effective diameter of the rear refracting surface 46b of the negative lens 46 is smaller than the effective diameter of the front refracting surface 46a of the negative lens 46.

The rear lens group 47 is composed of one correction lens 48. The rear lens group 47 has positive optical power as a whole. The optical material forming the correction lens 48 has normal dispersion characteristics and is made of, for example, a crown-type glass material. In the optical material forming the correction lens 48, the refractive index with respect to the d-line is described as nc, the Abbe number with respect to the d-line is described as vc, and the value calculated by differentiating the refractive index by temperature is described as dnc/dt.

The correction lens 48 is formed in a biconvex lens shape having a positive optical power, in which the front refracting surface 48a has a convex shape and the rear refracting surface 48b has a convex shape. The radius of curvature of the front refracting surface 48a of the correction lens 48 is smaller than the radius of curvature on the rear refracting surface 48b. The effective diameter of the rear refracting surface 48b of the correction lens 48 is substantially the same as the effective diameter of the front refracting surface 48a of the correction lens 48.

Next, the relationship between the lens groups 42, 45, 47 will be described. The condenser lens system 41 has a telephoto type lens configuration by arranging the middle lens group 45 having a negative optical power between the front lens group 42 having a positive optical power and the detection element 33. The principal point of the condenser lens system 41 having the telephoto lens configuration is located in a space outside the condenser lens system 41. Specifically, the principal point of the condenser lens system 41 is located in the space on the front side of the positions where the lenses 43, 44, 46, 48 are actually arranged. Therefore, the distance between the principal point and the detection element 33 can be increased. In other words, since the length of the lens barrel of the condenser lens system 41 can be shortened with respect to the focal length of the condenser lens system 41, the optical detector 10 can be downsized and easily mounted on a vehicle. Further, since the angle of view detected by the light receiving unit 31 can be narrowed, a specific narrow range can be detected with high accuracy.

The rear lens group 47 has a function of correcting the distortion of the condenser lens system 41 caused by the telephoto type combination of the front lens group 42 and the middle lens group 45. The distortion in the present embodiment is corrected to some amount that can avoid the deviation of detection pixel in the temperature change assumption range and the wavelength fluctuation assumption range. The amount for avoiding the deviation of detection pixel is defined such that the deviation amount of the actual imaging position by the condenser lens system 41 with respect to an ideal imaging position is smaller than the arrangement interval PT between the adjacent pixels, on the detection surface 34. Therefore, erroneous detection can be suppressed by avoiding an event in which the reflected light RL is detected in a pixel 35 different from the assumed pixel 35. The ideal imaging position represents an imaging position when the condenser lens system 41 virtually satisfies the normal image condition.

The condenser lens system 41 includes a temperature change factor TF and a chromatic aberration factor CF as factors that change the optical power of the entire lens system with respect to the reflected light RL. The temperature change factor TF increases the optical power of the entire lens system at a high temperature as compared with that at a low temperature. The temperature change factor TF is caused by temperature dependence of the refractive index in the optical materials forming the lenses 43, 44, 46, 48. The values of dna/dt, dnb/dt, and dnc/dt of the optical materials forming the lenses 43, 44, 46, 48 are positive. That is, as the temperature rises, the refractive index of each lens 43, 44, 46, 48 increases, so that the absolute value of the optical power of each lens 43, 44, 46, 48 increases. Since the optical power of the entire lens system is positive, the optical power of the entire lens system inevitably increases as the temperature rises, such that the temperature change factor TF causes an action of moving the focus to the front side.

In the present embodiment, plural optical materials having different derivative values of the refractive index with respect to temperature (that is, dn/dt) are used in the condenser lens system 41. It is possible to control the temperature change factor TF by the distribution of the optical power of the lens 46 formed of optical material having a relatively large dn/dt and the optical power of the lenses 43, 44, 48 formed of optical material having a relatively small dn/dt.

Figure 5:
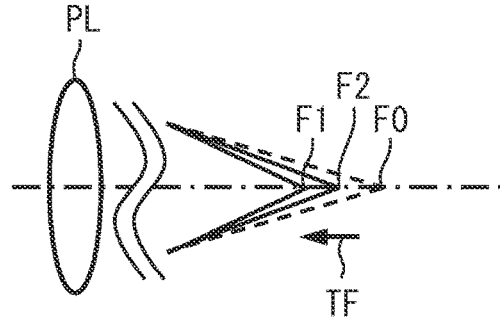
FIG. 5 is a diagram illustrating a relationship between a temperature change factor and a lens having a positive power.

The control of the temperature change factor TF will be described using lenses PL and NL of a virtual lens system model that imitates the condenser lens system 41. For example, as shown in FIG. 5, if the dn/dt of the optical material forming the lens PL having positive optical power is relatively large among the plural lenses of the virtual lens system model, the temperature change factor TF exerts the action of moving the focal point F1 to the front side at high temperature, with respect to the focal point F0 at ambient temperature, relatively strongly. If the dn/dt of the optical material forming the lens PL is relatively small, the temperature change factor TF relatively weakly exerts the effect of moving the focal point F2 forward at high temperature with respect to the focal point F0 at ambient temperature.

Figure 6:
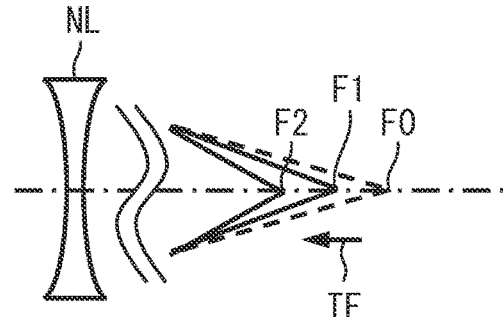
FIG. 6 is a diagram illustrating a relationship between a temperature change factor and a lens having a negative power.

Further, for example, as shown in FIG. 6, if the dn/dt of the optical material forming the lens NL having a negative optical power is relatively large among the plural lenses of the virtual lens system model, the temperature change factor TF relatively weakly exerts the action of moving the focal point F1 to the front side at high temperature, with respect to the focal point F0 at ambient temperature. If the dn/dt of the optical material forming the lens NL is relatively small, the temperature change factor TF relatively strongly exerts the effect of moving the focal point F2 forward at high temperature with respect to the focal point F0 at ambient temperature.

The chromatic aberration factor CF reduces the optical power of the lens system at long wavelengths than at short wavelengths. The chromatic aberration factor CF is caused by dispersion characteristics in the optical materials forming the lenses 43, 44, 46, 48. The chromatic aberration factor CF causes the action of forming a focal point on the rear side as the wavelength becomes longer. Therefore, "chromatic aberration" in the chromatic aberration factor CF means axial chromatic aberration. The chromatic aberration factor CF can be controlled by distributing the optical power of the lenses 43, 44, 48 formed of the low-dispersion optical material and the optical power of the lens 46 formed of the high-dispersion optical material.

Figure 7:
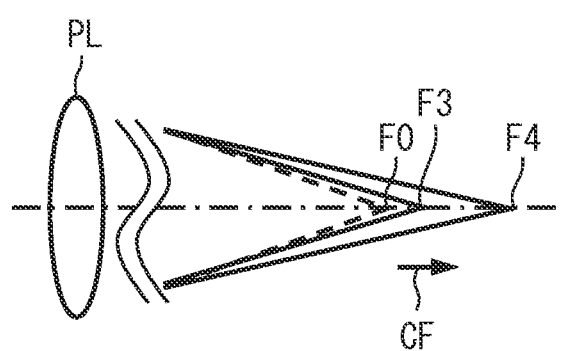
FIG. 7 is a diagram illustrating a relationship between a chromatic aberration factor and a lens having a positive power.

The control of the chromatic aberration factor CF will be described using the lenses PL and NL of the virtual lens system model that imitates the condenser lens system 41. For example, as shown in FIG. 7, if the Abbe number of the optical material forming the lens PL having positive optical power is relatively large (if the dispersion is low) among the plural lenses of the virtual lens system model, the chromatic aberration factor The CF relatively weakly exerts the action of moving the long-wavelength focal point F3 to the rear side with respect to the reference-wavelength focal point F0. If the Abbe number of the optical material forming the lens NL is relatively small (if the dispersion is high), the chromatic aberration factor CF relatively strongly exerts the action of moving the long-wavelength focal point F4 to the rear side with respect to the reference-wavelength focal point F0. If the Abbe number is relatively large, the dispersion is low. If the Abbe number is relatively small, the dispersion is high.

Figure 8:
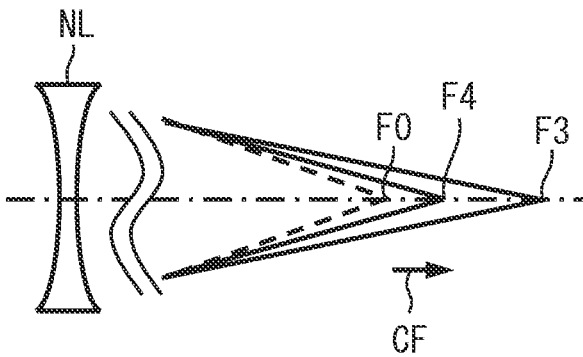
FIG. 8 is a diagram illustrating a relationship between a chromatic aberration factor and a lens having a negative power.

Further, for example, as shown in FIG. 8, if the Abbe number of the optical material forming the lens NL having a negative optical power is relatively large (if the dispersion is low) among the plural lenses of the virtual lens system model, the chromatic aberration factor CF relatively strongly exerts the action of moving the long-wavelength focal point F3 to the rear side with respect to the reference-wavelength focal point F0. If the Abbe number of the optical material forming the lens NL is relatively small (if the dispersion is high), the chromatic aberration factor CF relatively weakly exerts the action of moving the long-wavelength focal point F4 to the rear side with respect to the reference-wavelength focal point F0.

If the lens system has no relation between the temperature change and the wavelength change of the detected light, the temperature change factor TF and the chromatic aberration factor CF do not interlock. However, in the present embodiment, since the peak wavelength of the laser light LL, which is the source of the reflected light RL detected by the condenser lens system 41, has a temperature dependence, the temperature change factor TF and the chromatic aberration factor CF are linked with each other. That is, the chromatic aberration factor CF is linked with the temperature change factor TF based on the correspondence between the change in temperature and the shift amount of the peak wavelength since the peak wavelength of the laser light LL shifts to the longer wavelength as the temperature rises.

In the condenser lens system 41 of the present embodiment, the optical power is controlled among the lens groups 42, 45, 47 or the lenses 43, 44, 46, 48 based on such a correspondence relationship, in the wavelength fluctuation assumption range, so that the chromatic aberration factor CF is balanced with the temperature change factor TF. When the chromatic aberration factor CF is balanced with the temperature change factor TF, the fluctuation amount of the optical power is suppressed as a result of canceling the chromatic aberration factor CF and the temperature change factor TF so as to maintain the state where the detection surface 34 of the detection element 33 is included within the range of the depth of focus near the focal point of the condenser lens system 41.

In the present embodiment that realizes the above balance, the optical material of the front lens group 42 has a dispersion characteristic that is lower in dispersion than the optical material of the middle lens group 45. Further, the optical material of the front lens group 42 has a temperature dependence of the refractive index where the differential value of the refractive index with respect to temperature is smaller than that of the optical material of the middle lens group 45. In other words, the optical material of the middle lens group 45 has a dispersion characteristic that is higher in dispersion than the optical material of the front lens group 42, and the differential value of the refractive index with respect to temperature larger than the optical material of the front lens group 42.

If the above descriptions are expressed by mathematical formulas, $va > vb$ and $dna/dt < dnb/dt$ are established. Strictly speaking, $dna/dt$ and $dnb/dt$ are not fixed values but functions of temperature and wavelength. However, it is preferable that the relationship of $dna/dt < dnb/dt$ is maintained in the entirety of the temperature change assumption range and wavelength fluctuation assumption range.

The positive power is distributed to the optical material of the front lens group 42, and the negative power is distributed to the optical material of the middle lens group 45. Therefore, both the action of moving the focus to the front side by the temperature change factor TF and the action of moving the focus to the rear side by the chromatic aberration factor CF are weakened. Thus, it is possible to avoid a situation in which one of the temperature change factor TF and the chromatic aberration factor CF strongly acts to largely defocus the reflected light RL on the detection surface 34.

The optical material of the rear lens group 47 has a temperature dependence in the refractive index, where the differential value of the refractive index with respect to temperature is smaller than that of the optical material of the front lens group 42 and the optical material of the middle lens group 45. If these are expressed by mathematical formulas, dnc/dt<dna/dt and dnc/dt<dnb/dt are established. Strictly speaking, dnc/dt is not a fixed value but a function of temperature and wavelength. It is preferable that the relationship of dnc/dt<dna/dt and dnc/dt<dnb/dt is maintained in the entire range of the temperature change assumption range and the wavelength fluctuation assumption range. In this way, the contribution of the rear lens group 47 itself to the temperature change factor TF is made smaller than the contribution of the front lens group 42 and the contribution of the middle lens group 45.

Further, the optical material of the rear lens group 47 has a dispersion characteristic having a lower dispersion than that of the optical material of the middle lens group 45. This is expressed in a mathematical formula of vc>vb.

The advantages of the first embodiment will be described below.

In the first embodiment, the peak wavelength of the laser light LL, which is the source of the reflected light RL, has temperature dependence. In the condenser lens system 41, the optical power of the entire lens system fluctuates and increases due to the temperature change factor TF caused by the optical material in response to the environmental temperature change. Since the peak wavelength of the reflected light RL shifts in response to the temperature change, the optical power of the entire lens system with respect to the reflected light RL fluctuates and decreases due to the chromatic aberration factor CF caused by the chromatic aberration of the condenser lens system 41. The distribution of the optical power to the plural lenses 43, 44, 46, 48 of the condenser lens system 41 is set such that the chromatic aberration factor CF balances with the temperature change factor TF within the wavelength fluctuation assumption region where the shift in the peak wavelength is assumed.

That is, the chromatic aberration that shifts the focal point backward at a long wavelength is set based on the correspondence between the change in temperature and the shift amount of the peak wavelength, so as to cancel the forward shift of the focal point due to the optical material. Therefore, the light condensed state in which the detection element 33 is focused is maintained even with respect to the temperature change. Since the reflected light RL can be efficiently condensed on the detection element 33, the sensitivity of the detection element 33 to detect the reflected light RL is raised. Thus, the detection performance can be maintained in a high state.

Further, according to the first embodiment, the optical power is distributed among the lenses 43, 44, 46, 48 made of optical materials having different temperature dependences in the refractive index, that is, the temperature derivative values of the refractive index are different. Therefore, the temperature change factor TF and the chromatic aberration factor CF are adjusted so as to be balanced, so that the focused state on the detection element 33 against the temperature change can be enhanced.

Further, according to the first embodiment, the optical material forming the negative lens 46 has temperature dependence in dispersion characteristic which is higher than the optical material forming the positive lens 43, 44, and in refractive index in which the differential value in the refractive index with respect to the temperature is larger than that of the optical material forming the positive lens 43, 44. Thus, the focus move action can be suppressed when the temperature rises. In detail, the action of moving the focus to the front side due to the temperature dependence of the refractive index in the optical material can be reduced, and the action of moving the focus to the rear side due to the dispersion characteristics of the optical material can be reduced. Therefore, it is possible to avoid a situation in which the reflected light RL to be detected is largely defocused with respect to the detection element 33.

That is, it is possible to easily maintain the focused state in which the detection element 33 is in focus even with respect to a temperature change. Since the reflected light RL can be efficiently condensed on the detection element 33, the sensitivity of the detection element 33 to detect the reflected light RL can be raised, thus the detection performance can be maintained in a high state.

Further, according to the first embodiment, the middle lens group 45 having a negative optical power is arranged between the front lens group 42 having a positive optical power and the detection element 33. In such a lens configuration, the depth of focus tends to be relatively shallow. However, the chromatic aberration factor CF and the temperature change factor TF are made to balance with each other, such that the focus itself becomes difficult to move in response to a temperature change. Therefore, the depth of focus is improved, such that the sensitivity of the detection element 33 to detect the reflected light RL can be maintained in a high state.

Further, according to the first embodiment, the optical material forming the correction lens 48 in the rear lens group 47 has temperature dependence in the refractive index. The differential value of the refractive index with respect to temperature is smaller in the optical material forming the correction lens 48 than in the optical material forming the positive lens 43, 44 in the front lens group 42. Since the contribution of the rear lens group 47 to the temperature change factor TF can be reduced, it is possible to suppress the distribution of the optical power to the correction lens 48 from being greatly restricted by the balance between the factors TF and CF. Since the distortion can be corrected for the rear lens group 47, the accuracy of the imaging position is improved when the reflected light RL is imaged on the detection element 33. Therefore, the detection performance can be maintained in a high state.

Further, according to the first embodiment, the distortion corrected by the rear lens group 47 is set in a range such that a deviation in the actual imaging position of the lens system 41 on the detection surface 34 with respect to the ideal imaging position where the image alignment condition is satisfied is smaller than the arrangement interval PT. Since the arrangement interval PT is an interval between the pixels 35 on the detection surface 34, it is avoided that the reflected light RL is detected at a pixel 35 different from the assumed pixel 35. Therefore, erroneous detection can be suppressed.

The front lens group 42 in the first embodiment corresponds to a first lens group. The middle lens group 45 corresponds to a second lens group. The rear lens group 47 corresponds to a third lens group.

Second Embodiment

Figure 9:
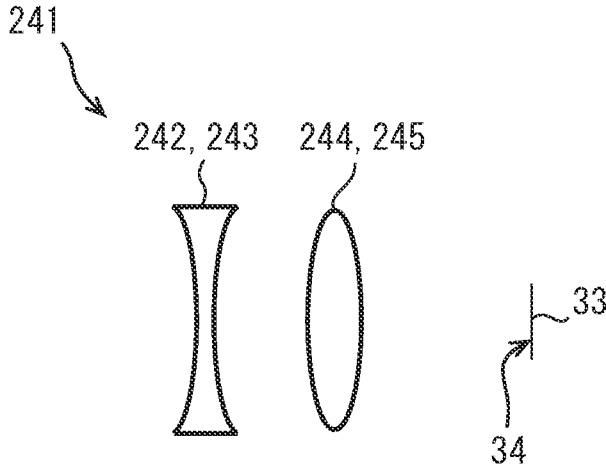
FIG. 9 is a diagram illustrating a condenser lens system and a detection element according to a second embodiment.

As shown in FIG. 9, a second embodiment is a modification of the first embodiment. The second embodiment will be described focusing on matters different from the first embodiment.

The condenser lens system 241 of the second embodiment has a lens configuration of two elements in two groups. Specifically, the condenser lens system 241 includes a front lens group 242 and a rear lens group 244. The front lens group 242 is arranged at a position the farthest from the detection element 33 among the lens groups 242 and 244. The rear lens group 244 is arranged between the front lens group 242 and the detection element 33. The optical power of the entire lens system is a combined optical power of the front lens group 242 and the rear lens group 244.

The front lens group 242 is composed of one negative lens 243. Therefore, the front lens group 242 has a negative power as a whole. For example, the optical material forming the negative lens 243 may be the same material as the optical material forming the middle lens group 45 of the first embodiment.

The rear lens group 244 is composed of one positive lens 245. Therefore, the rear lens group 244 has a positive power as a whole. For example, the optical material forming the positive lens 245 may be the same material as the optical material forming the front lens group 42 of the first embodiment. In this way, the condenser lens system 241 of the second embodiment has a reverse telescope type lens configuration. Since the angle of view detected by the light receiving unit 31 can be widened, the reflected light RL can be detected from a wide range.

According to the second embodiment, the front lens group 242 having a negative optical power is arranged on the opposite side of the detection element 33 through the rear lens group 244 having a positive optical power. In such a lens configuration, it is possible to increase the tolerance in the balance between the chromatic aberration factor CF and the temperature change factor TF by increasing the depth of focus. Therefore, it is possible to easily maintain the condensing state in which the detection element 33 is in focus.

The front lens group 242 in the second embodiment corresponds to a second lens group. The rear lens group 244 corresponds to a first lens group.

Third Embodiment

As shown in FIGS. 10 to 14, a third embodiment is a modification of the first embodiment. The third embodiment will be described focusing on the points different from the first embodiment in details.

In the third embodiment, the optical detector includes the scanning unit 21, the light receiving unit 31, the housing 351 and the light emitting unit 11.

Figure 10:
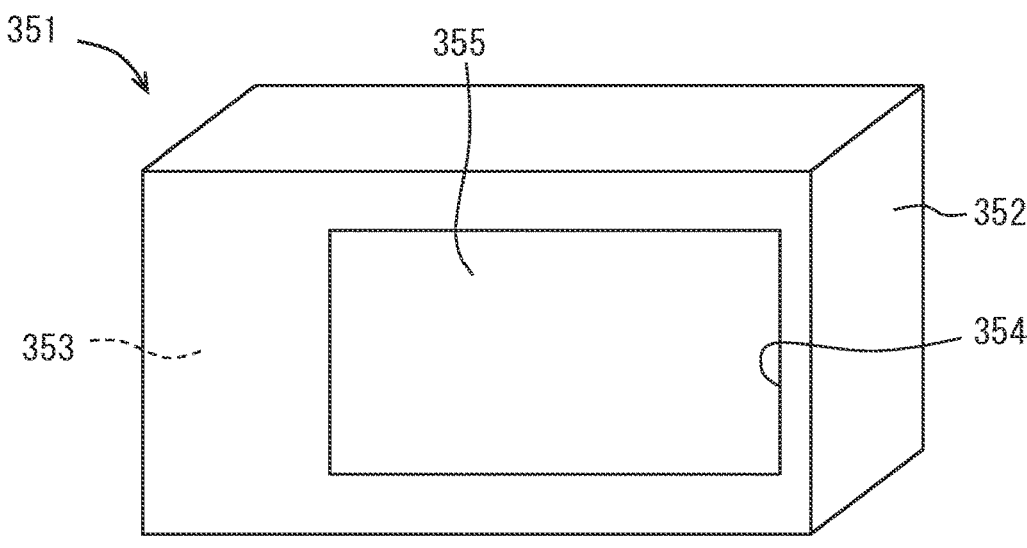
FIG. 10 is a perspective view illustrating an optical detector according to a third embodiment.

As shown in FIG. 10, the housing 351 of the third embodiment has an outer wall portion 352 and a cover plate 355 so as to form an exterior (outer shell) of the optical detector 10. The housing 351 is formed of, for example, synthetic resin or metal having a light-shielding property, and shaped in a rectangular parallelepiped box having the outer wall portion 352. The housing 351 may be configured by one component or may be configured by combining plural components. The housing 351 has a storage chamber 353 for storing the light emitting unit 11, the scanning unit 21, and the light receiving unit 31, surrounded by the outer wall portion 352. One storage chamber 353 is provided in common for the light emitting unit 11 and the light receiving unit 31 in this embodiment. Due to the one storage chamber 353, no partition wall is provided between the light emitting unit 11 and the light receiving unit 31, so that it is possible to downsize the optical detector 10.

The light emitting unit 11 and the light receiving unit 31 are held so as to be substantially fixed to the housing 351. The scanning unit 21 is fixed to the housing 351 so as to be rotatable or reciprocate by driving a motor.

The housing 351 has an optical window 354 such as an opening for reciprocating both the projected laser light LL and the reflected light RL from the measurement region. One optical window 354 is provided in common for both the light emitting unit 11 and the light receiving unit 31, in this embodiment. The laser light LL may be referred to as a projection beam, and the reflected light RL may be referred to as a reflected beam.

The cover plate 355 is formed of a base material such as synthetic resin or glass, and is shaped in, for example, a flat plate capable of transmitting the laser light LL and the reflected light RL. The cover plate 355 is arranged so as to close the entire surface of the optical window 354, and blocks foreign matter from entering the storage chamber 353 from outside.

The cover plate 355 has a film such as optical thin film on the surface of the base material, or the base material is colored, for transmitting light in the near infrared region, more specifically, light in the expected range where the wavelength fluctuates. Further, it is preferable to have a wavelength dependence on the transmittance such that the visible light is blocked. Thus, it is possible to restrict the inside of the storage chamber 353 from being viewed from the outside. Further, a mirror-like base material surface may be exposed on one surface of the cover plate 355 facing the storage chamber 353 or/and the other surface on the measurement side. Alternatively, an antireflection film or moth-eye structure may be formed on one surface of the cover plate 355 facing the storage chamber 353 or/and the other surface on the measurement side.

Figure 11:
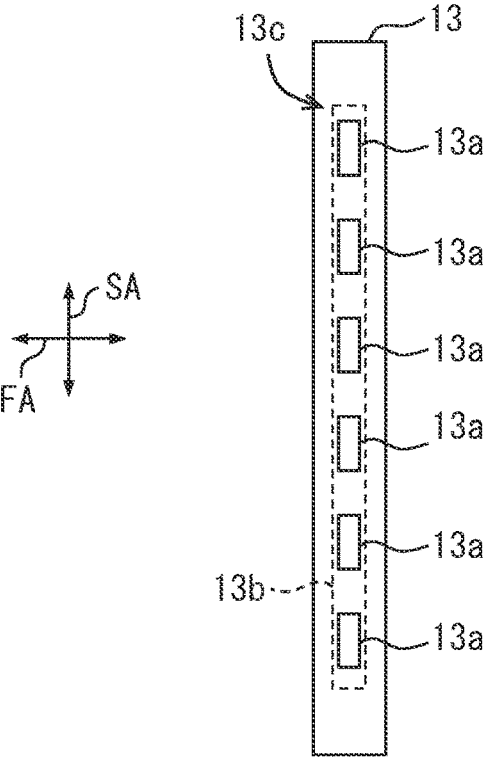
FIG. 11 is a front view illustrating a laser emitting element.

As shown in FIG. 11, in the light emitting unit 11 of the third embodiment, the laser emitting element 13 is similar to that of the first embodiment. The laser emitting element 13 has one array of the laser diodes 13a as light emitting source on the substrate. The laser diodes 13a are arranged in a predetermined arrangement direction with intervals. In the Fabry-Perot resonator structure described above, the PN junction layers of the laser diode 13a are stacked in a perpendicular direction perpendicular to the arrangement direction, commonly to each other. The arrangement direction is a longitudinal direction of the linear-spot-shaped beam.

An axis along the perpendicular direction is a fast axis of the laser diode 13a. An axis along the arrangement direction is a slow axis in the laser diode 13a. The laser light LL has a larger divergence angle in the fast axis direction FA than in the slow axis direction SA.

An aggregate of the laser diodes 13a forms a light emitting window portion 13b as a macroscopic opening portion. In the present embodiment, the light emitting window portion 13b has an elongated substantially rectangular shape. The dimension in the longitudinal direction of the light emitting window portion 13b is set to, for example, 100 times or more larger than the dimension in the lateral direction. The dimension in the longitudinal direction is a dimension along the slow axis direction SA. The dimension in the lateral direction is a dimension along the fast axis direction FA. The longitudinal direction of the light emitting window portion 13b is along the vertical direction in a state where this device is mounted on a vehicle in a general mounting mode. Further, a surface along the light emitting window portion 13b is defined as a light emitting surface 13c. The light emitting window portion 13b is covered with a translucent cover 13d having translucency, which is formed of, for example, a glass material or a synthetic resin material shaped in a thin plate.

The light emitting unit 11 emits a line-shaped beam extending in the slow axis direction SA as the laser light LL. This line-shaped beam may be realized by simultaneously emitting light from the laser diodes 13a, and is equivalent to a line-shaped beam by emitting light with a slight time difference from the laser diodes 13a.

The mirror 22 of the scanning unit 21 can scan the linear beam in the scanning direction along the fast axis direction FA by reciprocating the reflecting surface 23 around the rotation axis RA along the slow axis direction SA.

In the light emitting unit 11 of the third embodiment, the projecting lens system 15 includes plural lenses 316a and 317a. The combined optical power of the lenses 316a and 317a constituting the projecting lens system 15 is positive, as the optical power of the entire lens system.

Figure 12:
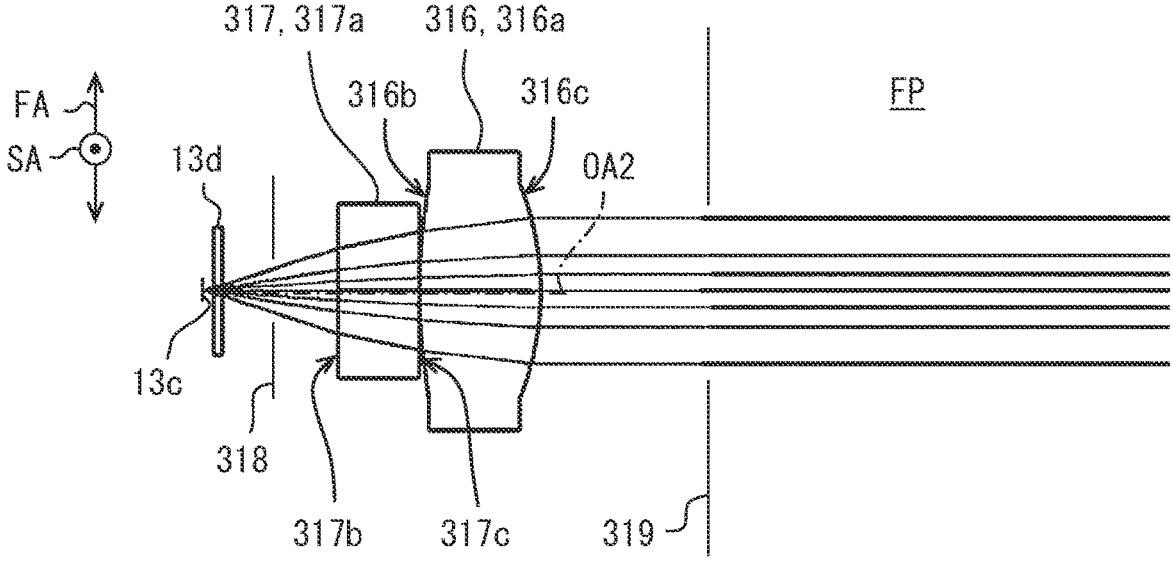
FIG. 12 is an optical path diagram on a fast axis/optical axis plane of a projecting lens system of the third embodiment.
Figure 13:
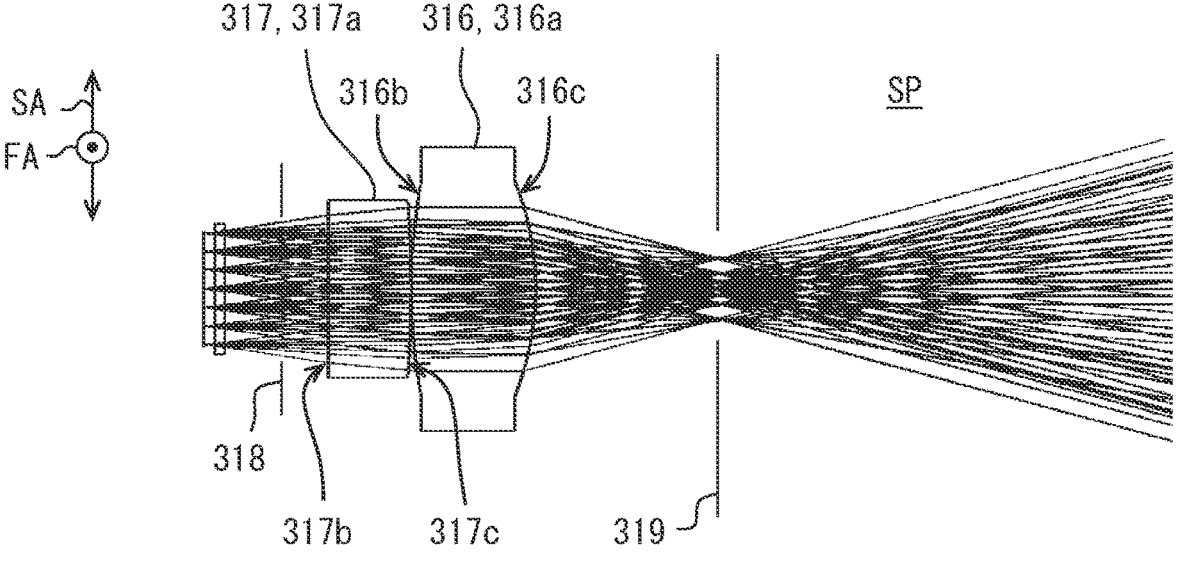
FIG. 13 is an optical path diagram on a slow axis/optical axis plane of the projecting lens system of the third embodiment.

As shown in FIGS. 12 and 13, the projecting lens system 15 is arranged so as to focus the entire lens system on the light emitting surface 13c. Specifically, the projecting lens system 15 is arranged so as to focus the front focal point of the entire lens system on the light emitting surface 13c. As a result, the laser light LL reaches far away in a thinner state. The laser light LL is reflected by the measurement object 1 existing in the distance. Since the amount of the reflected light RL returning to the light receiving unit 31 is secured, the detection distance can be increased as a result. The projecting lens system 15 is an optical system athermalized within the assumed range of temperature change described in the first embodiment.

The projecting lens system 15 includes a main lens group 316 and an adjustment lens group 317. The main lens group 316 is arranged on a side opposite to the laser emitting element 13 through the adjustment lens group 317. The adjustment lens group 317 is arranged between the main lens group 316 and the laser emitting element 13.

The lens group 316 includes one or more lenses 316a, and the lens group 317 includes one or more lenses 317a. In the present embodiment, the main lens group 316 is composed of one lens 316a, and the adjustment lens group 317 is composed of one lens 317a. A virtual axis connecting the vertices of the lenses 316a and 317a and passing through the center of the light emitting window portion 13b is defined as an optical axis OA2 of the projecting lens system 15 in the present embodiment.

Hereinafter, the details of each lens group 316, 317 will be described. The main lens group 316 is composed of one positive lens 316a. Therefore, the main lens group 316 has a positive power as a whole. The optical material forming the positive lens 316a can be, for example, a crown-based glass material or a synthetic resin material such as a poly-carbonate resin, and has normal dispersion characteristics. In the optical material forming the positive lens 316a, for example, dnx/dt>0 is satisfied, when nx represents a refractive index with respect to the d-line, vx represents the Abbe number with respect to the d-line, and dnx/dt represents a temperature differentiating value of the refractive index.

The refracting surface 316b, 316c of the positive lens 316a may be configured such that the optical material is exposed, or a functional coating such as an antireflection coating may be provided. When the optical material is exposed, the refracting surface 316b, 317c may be formed smoothly, or a moth-eye structure or the like may be provided. These can be similarly applied to the refracting surface 317b, 317c of the adjustment lens group 317.

The positive lens 316a is formed as a biconvex lens in which the front refracting surface 316b has a convex shape and the rear refracting surface 316c has a convex shape. The refracting surface 316b, 316c having optical power may be formed in a spherical shape or may be formed in a rotationally symmetric aspherical shape having rotational invariance. For example, the radius of curvature of the positive lens 316a on the front refracting surface 316b is larger than the radius of curvature on the rear refracting surface 316c.

The adjustment lens group 317 is composed of one cylindrical lens 317a. The cylindrical lens 317a of the present embodiment has substantially zero optical power in a cross section including the optical axis OA2 of the light projecting lens system 15 and the fast axis direction FA of the laser emitting element 13. Hereinafter, the cross section including the optical axis OA2 of the light projecting lens system 15 and the fast axis direction FA of the laser emitting element 13 is referred to as a fast axis/optical axis plane FP. Further, the cylindrical lens 317a has substantially positive optical power in the cross section including the optical axis OA2 and the slow axis direction SA of the laser emitting element 13. Hereinafter, the cross section including the optical axis OA2 and the slow axis direction SA of the laser emitting element 13 is referred to as a slow axis/optical axis plane SP. The optical material forming the cylindrical lens 317a can be, for example, a crown-based glass material or a synthetic resin material such as a polycarbonate resin, and has normal dispersion characteristics. In the optical material forming the cylindrical lens 317a, for example, dny/dt>0 is satisfied, when ny represents the refractive index with respect to the d-line, vy represents the Abbe number with respect to the d-line, and dny/dt represents the temperature differentiating value of the refractive index. The sign (plus or minus) of dny/dt is the same as dnx/dt.

The front refracting surface 317b of the cylindrical lens 317a is formed in a planar shape. The rear refracting surface 317c of the cylindrical lens 317a is formed in a convex cylindrical surface shape having a generatrix along the fast axis direction FA. That is, the rear refracting surface 317c does not have the curvature in the fast axis direction FA, but has the curvature in the slow axis direction SA. Having no curvature means that the radius of curvature is infinite. Having a curvature means that the radius of curvature is finite. As a result, in the fast axis/optical axis plane FP, the cross section of the cylindrical lens 317a forms, for example, a rectangular cross section as if it were a mere flat glass plate. In the slow axis/optical axis plane SP, the cross section of the cylindrical lens 317a has a plano-convex lens shape. The interval between the cylindrical lens 317a of the adjustment lens group 317 and the positive lens 316a of the main lens group 316 is made smaller than the center thickness of the cylindrical lens 317a and smaller than the center thickness of the positive lens 316a.

In this way, the light projecting lens system 15 collimates the laser light LL in the fast axis/optical axis plane FP and projects the light toward the measurement region. The collimating is not limited to the meaning of making the laser light LL from the laser emitting element 13 a completely parallel light flux, and also means that the laser light LL is made closer to the parallel light beam than that immediately after being emitted from the laser emitting element 13. Since only the positive lens 316a has the optical power in the fast axis/optical axis plane FP, the laser light LL is collimated by the main lens group 316.

The projecting lens system 15 exhibits a stronger light-collecting function in the slow axis/optical axis plane SP than in the fast axis/optical axis plane FP, due to the shape of the cylindrical lens 317a. Specifically, the cylindrical lens 317a has a configuration in which the optical power in the slow axis direction SA is shifted in the positive direction with respect to the optical power in the fast axis direction FA. As a result, the position of the beam waist of the laser light LL in the slow axis/optical axis plane SP can be brought closer to the position of the beam waist of the laser light LL in the fast axis/optical axis plane FP.

Similar to the condenser lens system 41 in the light receiving unit 31 of the first embodiment, the projecting lens system 15 includes the chromatic aberration factor CF and the temperature change factor TF. The optical power of each lens 316a, 317a is adjusted so that the chromatic aberration factor CF is balanced with the temperature change factor TF, in the fast axis/optical axis plane FP of the projecting lens system 15.

In the third embodiment, the cylindrical lens 317a having no (zero) optical power is inserted between the positive lens 316a and the laser emitting element 13 in the fast axis/optical axis plane FP. As a result, the optical path length between the laser emitting element 13 and the positive lens 316a becomes longer by an amount obtained by multiplying the thickness inside the cylindrical lens 317a by the refractive index −1. As a result, the cylindrical lens 317a is provided with a function of adjusting the focal length of the front focal point. This focal length adjustment function exerts the same effect as the lens NL, shown in FIGS. 6 and 8, having a negative optical power, in a relative comparison with the positive lens 316a having a positive optical power. In this way, the cylindrical lens 317a functions as an adjustment lens for adjusting the focal length with respect to the temperature change and the wavelength fluctuation corresponding to the temperature change.

Figure 14:
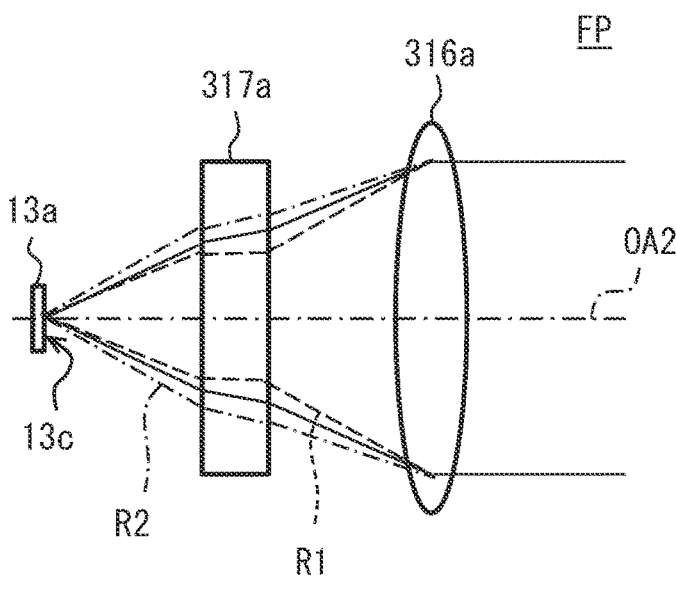
FIG. 14 is a diagram illustrating a relationship between a temperature change in the projecting lens system and a path of light.

For convenience, FIG. 14 shows a schematic diagram in which the focal position of the positive lens 316a is traced in the reverse direction from the emit direction of the laser light LL. For example, as shown in FIG. 14, when the temperature rises from a normal temperature, the light ray R1 passing through the cylindrical lens 317a in the fast axis/optical axis plane FP shifts relatively to the inner peripheral side. However, defocusing on the light emitting surface 13c is suppressed. When the temperature is lowered from a normal temperature, the light ray R2 transmitted through the cylindrical lens 317a in the fast axis/optical axis plane FP is relatively shifted to the outer peripheral side. However, defocusing on the light emitting surface 13c is suppressed.

In this way, the chromatic aberration factor CF and the temperature change factor TF are balanced with higher accuracy in the fast axis/optical axis plane FP than in the slow axis/optical axis plane SP. In other words, the focal movement amount of the projecting lens system 15 in the assumed range of temperature change or wavelength fluctuation in the fast axis/optical axis plane SP is smaller than that in the slow axis/optical axis plane SP.

The balance between the chromatic aberration factor CF and the temperature change factor TF can be set accurate by not only simply distributing the optical power between the positive lens 316a and the cylindrical lens 317a, but also setting the thickness of the cylindrical lens 317a. For example, the thickness can be set with reference to the center thickness. As a result, the focal movement amount of the projecting lens system 15 in the fast axis/optical axis plane FP can be suppressed to 15 μm or less, for example, about 12 μm in the assumed range of temperature change.

Further, as shown in FIGS. 12 and 13, diaphragms 318, 319 may be arranged before and after the light projecting lens system 15. Specifically, the field diaphragm 318 is arranged between the laser emitting element 13 and the positive lens 316a, more specifically, between the laser emitting element 13 and the cylindrical lens 317a. The field diaphragm 318 forms a front opening that opens in a substantially rectangular shape with the slow axis direction SA as the longitudinal direction. The field diaphragm 318 limits the angle of the laser light LL emitted from the light emitting window portion 13b.

The aperture diaphragm 319 is arranged on a side opposite to the field diaphragm 318 through the positive lens 316a, for example, between the positive lens 316a and the mirror 22. The aperture diaphragm 319 forms a rear opening that opens in a substantially rectangular shape with the fast axis direction FA as the longitudinal direction. The aperture diaphragm 319 can block the stray light generated in the slow axis/optical axis plane SP while transmitting the laser light LL which is substantially parallel light in the fast axis/optical axis plane FP. The numerical aperture of the projecting lens system 15 may be controlled by the aperture diaphragm 319, or may be based on the divergence angle characteristic of each laser diode 13a. In the present embodiment, the numerical aperture of the projecting lens system 15 is larger in the fast axis/optical axis plane FP than in the slow axis/optical axis plane SP.

In this way, the focus of the light projecting lens system 15 is suppressed from being defocused from the laser emitting element 13. Therefore, the spot shape of the laser light LL emitted from the light projecting lens system 15 is in a thin state even in the distant field, and the decrease in illuminance to the measurement object 1 is suppressed. Therefore, it is possible to suppress a decrease in the detection distance of the optical detector 10 due to a temperature change. The spot shape of the laser light LL becomes elongated, even in the distant field, as the line-shaped beam.

According to the third embodiment, the optical power of the entire lens system fluctuates in an increasing direction due to the temperature change factor TF caused by the optical material, in the projecting lens system 15, as the temperature of the environment changes. Since the laser light LL has a temperature dependence, together with this temperature change, the peak wavelength of the laser light LL also shifts. Therefore, the optical power of the entire lens system can fluctuate also in a decreasing direction, with respect to the lase light LL, due to the chromatic aberration factor CF caused by the chromatic aberration of the projecting lens system 15. The optical power distribution relative to the lenses 316a and 317a of the projecting lens system 15 is set so that the chromatic aberration factor CF balances with the temperature change factor TF in the assumption range of wavelength fluctuation where the shift in peak wavelength is expected.

That is, the chromatic aberration that shifts the long wavelength to the front side is set to cancel the shift of the focal point to the rear side due to the optical material, based on the correspondence between the amount of temperature change and the amount of shift in the peak wavelength. Therefore, the state in which the laser emitting element 13 is in focus is maintained even with respect to the temperature change. Since the intended spot shape can be maintained, the laser light LL can be effectively projected to the measurement object 1. Therefore, the performance of detecting the reflected light RL reflected on the measurement object 1 can be maintained in a high state.

Further, according to the third embodiment, in the projecting lens system 15, the amount of focus movement in the assumed range of wavelength fluctuation in the fast axis/optical axis plane FP is smaller than the amount of focus movement in the assumed range of wavelength fluctuation in the slow axis/optical axis plane SP. That is, even when the depth of focus of the projecting lens system 15 in the fast axis/optical axis plane FP is shallow, it becomes easy to balance the chromatic aberration factor CF with the temperature change factor TF. Therefore, the projecting lens system 15 can be realized in which the irradiation efficiency of the laser light LL is further improved by increasing the numerical aperture, for the fast axis direction FA in which the emission angle of the laser light LL emitted from the laser emitting element 13 is larger than that in the slow axis direction SA.

Further, according to the third embodiment, in the projecting lens system 15, the positive lens 316a is combined with the cylindrical lens 317a as an adjustment lens having an optical power smaller than or equal to 0 in the fast axis/optical axis plane FP. In such a configuration, the cylindrical lens 317a exerts a function of adjusting the focal length in response to a temperature change and a wavelength change corresponding to the temperature change. Thus, the focal point of the projecting lens system 15 can be suppressed from defocusing from the laser emitting element 13 in the fast axis/optical axis plane FP.

Further, according to the third embodiment, in the cylindrical lens 317a, the difference between the optical power in the fast axis/optical axis plane FP and the optical power in the slow axis/optical axis plane SP is negative. In this way, the projecting lens system 15 can project the laser light LL in which a divergence angle in the fast axis direction FA is larger than a divergence angle in the slow axis direction SA at the time of light emission so as to provide a smaller spot shape in the measurement region.

Further, according to the third embodiment, in the cylindrical lens 317a, the optical power in the fast axis/optical axis plane FP is 0, and the optical power in the slow axis/optical axis plane SP is positive. In the fast axis/optical axis plane FP where the optical power is 0, the focal length can be adjusted for a temperature change and the corresponding wavelength fluctuation by the function of adjusting the optical path length using the thickness of the lens 317a. Therefore, it is possible to restrict the focus of the projecting lens system 15 from defocusing from the laser emitting element 13 in the fast axis/optical axis plane FP.

Further, according to the third embodiment, the adjustment lens group 317 is arranged between the main lens group 316 and the laser emitting element 13. In this arrangement, the laser light LL can pass through the adjustment lens group 317 before being collimated by the main lens group 316. That is, the adjustment lens group 317 can change the incident angle of the laser light LL incident on the main lens group 316, in response to the temperature change, when the laser light LL is projected to the distant measurement region, so as to maintain the spot shape in the measurement region.

Fourth Embodiment

Figure 15:
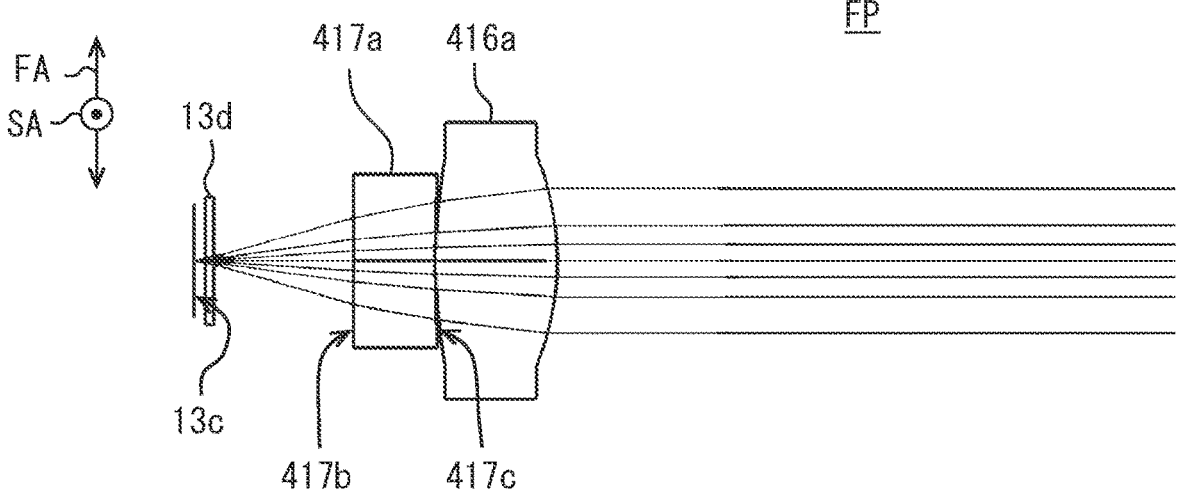
FIG. 15 is an optical path diagram on a fast axis/optical axis plane of a projecting lens system of a fourth embodiment.
Figure 16:
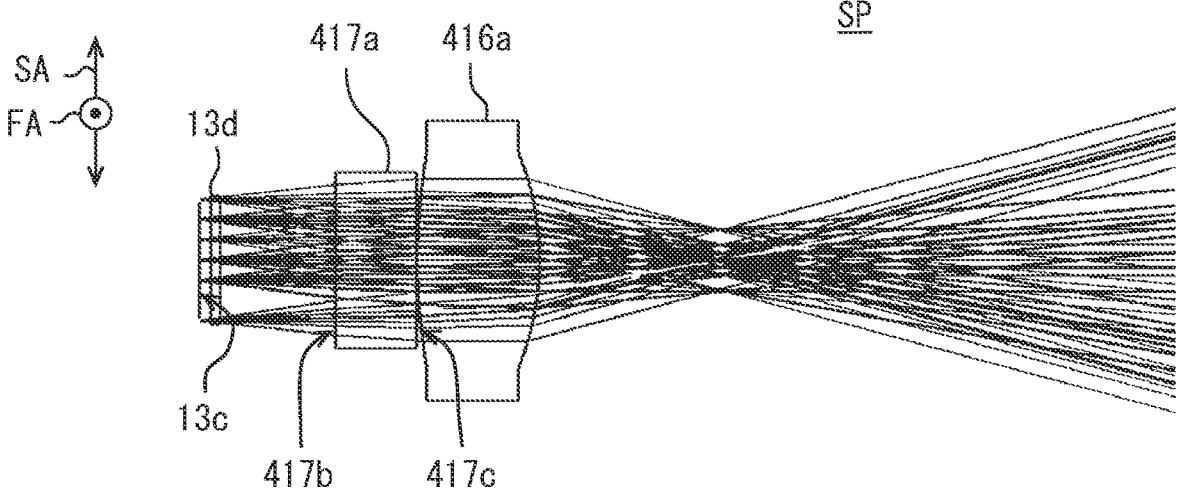
FIG. 16 is an optical path diagram on a slow axis/optical axis plane of the projecting lens system of the fourth embodiment.

As shown in FIGS. 15 and 16, the fourth embodiment is a modification of the third embodiment. The fourth embodiment will be described focusing on configurations different from the third embodiment.

In the projecting lens system 15 of the fourth embodiment, the cylindrical lens 417a has a negative power in the fast axis/optical axis plane FP. The cylindrical lens 417a has a substantially zero optical power in the slow axis/optical axis plane SP. Similar to the third embodiment, the cylindrical lens 417a has a configuration in which the optical power of the fast axis direction FA is shifted in the negative direction with respect to the optical power of the slow axis direction SA.

The front refracting surface 417b of the cylindrical lens 417a is formed in a planar shape as in the third embodiment.

On the other hand, the rear refracting surface 417c of the cylindrical lens 417a is formed in a concave cylindrical surface shape having a generatrix along the slow axis direction SA. That is, the rear refracting surface 417c does not have a curvature in the slow axis direction SA, but has a curvature in the fast axis direction FA. As a result, in the fast axis/optical axis plane FP, the cross section of the cylindrical lens 417a has a plano-concave lens shape. In the slow axis/optical axis plane SP, the cross section of the cylindrical lens 417a has a rectangular shape, for example, like a mere flat glass plate.

The positive lens 416a of the fourth embodiment has the positive optical power larger than that of the positive lens 316a of the third embodiment so as to cancel the negative optical power of the cylindrical lens 417a for the projecting lens system 15 to collimate the laser light LL.

According to the fourth embodiment, in the cylindrical lens 417a, the optical power in the fast axis/optical axis plane FP is negative, and the optical power in the slow axis/optical axis plane SP is zero. In the fast axis/optical axis plane FP, the temperature change effect can be exerted by the cylindrical lens 417a to cancel the temperature change effect of the positive lens 416a. At the same time, in the slow axis/optical axis plane SP, the focal length can be adjusted with respect to the temperature change and the wavelength change corresponding to the temperature change by the function of adjusting the optical path length utilizing the thickness of the lens 417a.

Fifth Embodiment

Figure 17:
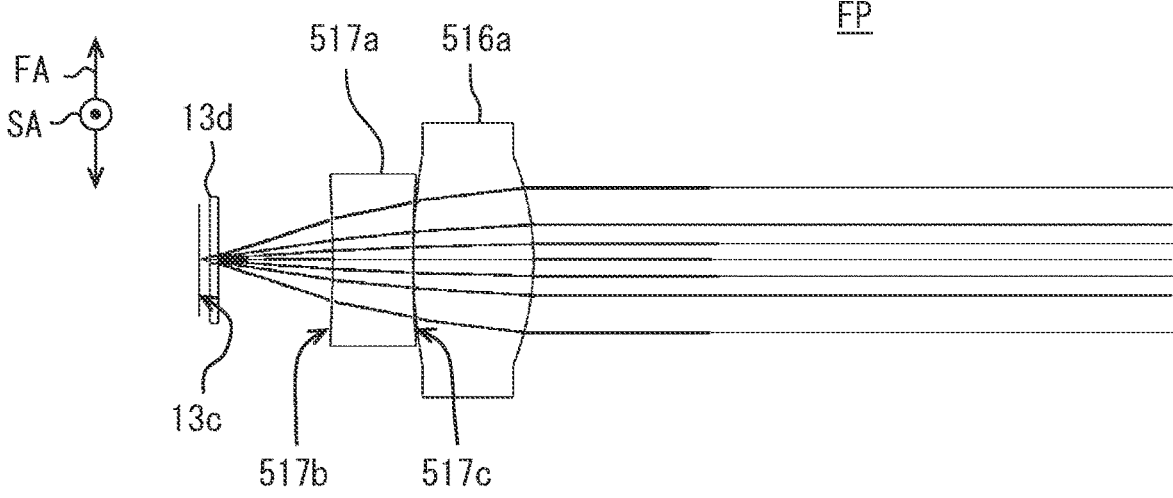
FIG. 17 is an optical path diagram on a fast axis/optical axis plane of a projecting lens system of a fifth embodiment.
Figure 18:
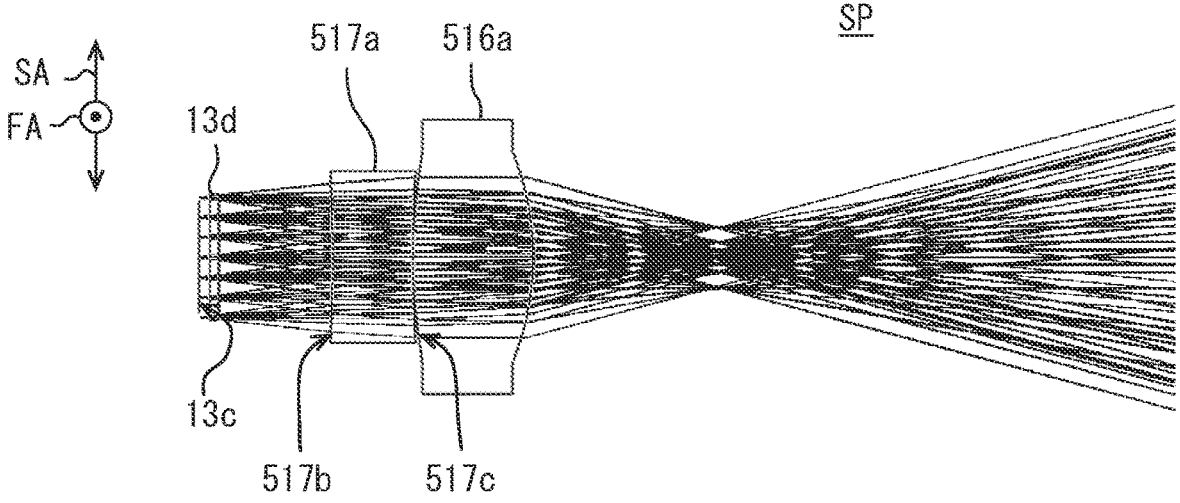
FIG. 18 is an optical path diagram on a slow axis/optical axis plane of the projecting lens system of the fifth embodiment.

As shown in FIGS. 17 and 18, the fifth embodiment is a modification of the third embodiment. The fifth embodiment will be described focusing on configurations different from the fourth embodiment.

In the projecting lens system 15 of the fifth embodiment, the cylindrical lens 517a has a negative power in the fast axis/optical axis plane FP. The cylindrical lens 517a has a negative optical power in the slow axis/optical axis plane SP, which is deviated in the positive direction relative to the optical power in the fast axis/optical axis plane FP. Similar to the third embodiment, the cylindrical lens 517a has a configuration in which the optical power of the fast axis direction FA is shifted in the negative direction with respect to the optical power of the slow axis direction SA.

The front refracting surface 517b of the cylindrical lens 517a is concave and is formed into a spherical shape or a rotationally symmetric aspherical shape having rotation invariance. The rear refracting surface 517c of the cylindrical lens 517a is formed in a concave cylindrical surface shape having a generatrix along the slow axis direction SA. That is, the rear refracting surface 517c does not have a curvature in the slow axis direction SA, but has a curvature in the fast axis direction FA. As a result, in the slow axis/optical axis plane SP, the cross section of the cylindrical lens 517a has a plano-concave lens shape.

The positive lens 516a of the fifth embodiment has the positive optical power larger than that of the positive lens 316a of the third embodiment so as to cancel the negative optical power of the cylindrical lens 517a for the projecting lens system 15 to collimate the laser light LL.

According to the fifth embodiment, in the cylindrical lens 317a, the optical power in the fast axis/optical axis plane FP is negative, and the optical power in the slow axis/optical axis plane SP is negative. In both the fast axis/optical axis plane FP and the slow axis/optical axis plane SP, the temperature change effect of the cylindrical lens 317a can be exerted to cancel the temperature change effect of the positive lens 316a.

Sixth Embodiment

As shown in FIGS. 19 to 22, a sixth embodiment is a modification to the first embodiment. The sixth embodiment will be described focusing on configurations different from the first embodiment.

Figure 19:
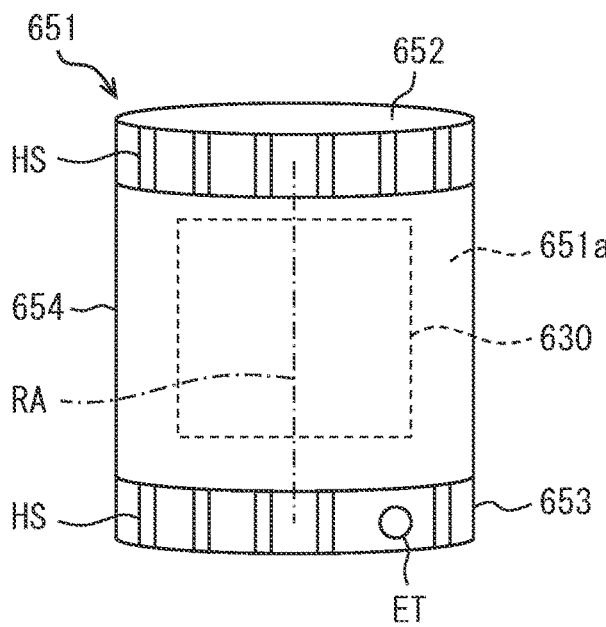
FIG. 19 is a perspective view illustrating an optical detector according to a sixth embodiment.

The optical detector 10 of the sixth embodiment includes a housing 651, a light emitting/receiving body 630, and a scanning unit 621. The housing 651 shown in FIG. 19 is formed in a cylindrical shape, for example, including an upper bottom portion 652, a lower bottom portion 653, and an optical window portion 654. The housing 651 combines the upper bottom portion 652, the lower bottom portion 653, and the optical window portion 654 to form a storage chamber 651a for storing the light emitting/receiving body 630 and the scanning unit 621.

The upper bottom portion 652 and the lower bottom portion 653 are formed of a metal such as aluminum or a synthetic resin having a light-shielding property. The upper bottom portion 652 and the lower bottom portion 653 support the light emitting/receiving body 630 as rotatable, and hold the scanning unit 621. At least one of the upper bottom portion 652 and the lower bottom portion 653 has a terminal ET having at least one of a function of supplying electric power from the outside and a function of outputting the detection result from the detection element unit 662 to the outside.

Further, at least one of the upper bottom portion 652 and the lower bottom portion 653 may be provided with a heat sink structure HS that dissipates heat generated in the storage chamber 651a. The heat sink structure HS increases the surface area of the upper bottom portion 652 and the lower bottom portion 653, for example, due to protrusions or grooves arranged in the circumferential direction of a cylindrical container.

The optical window portion 654 is arranged between the upper bottom portion 652 and the lower bottom portion 653, and is formed in a cylindrical tubular shape opened to both the bottom portions 652 and 653 so as to connect the upper bottom portion 652 and the lower bottom portion 653. The optical window portion 654 is formed by a base material made of, for example, synthetic resin or glass, so as to transmit the laser light LL and its reflected light RL. Further, it is preferable that the optical window portion 654 transmits light in the near infrared region, more specifically, light in the assumed range of wavelength fluctuation, by coloring the base material, forming an optical thin film, or attaching a film to the surface of the base material. Further, it is preferable that the optical window portion 654 has a wavelength dependence on the transmittance so as to block visible light.

Figure 20:
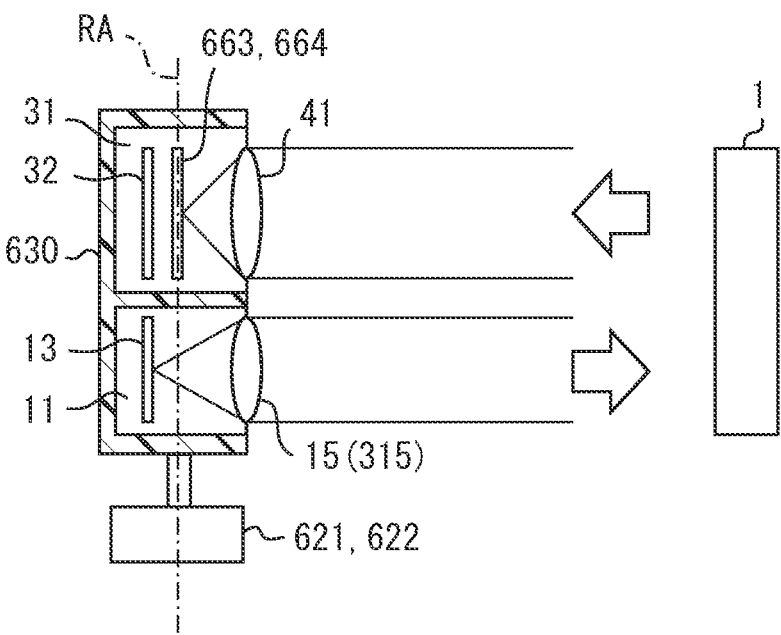
FIG. 20 is a diagram corresponding to FIG. 2 in the sixth embodiment.

As shown in FIG. 20, the light emitting/receiving body 630 receives and holds the light emitting unit 11 and the light receiving unit 31 in a housing that separately partitions the light emitting unit 11 and the light receiving unit 31. The housing is formed of, for example, a metal or a synthetic resin with a light-shielding property. In this way, the light emitting unit 11 and the light receiving unit 31 become an integrated unit. The light emitting unit 11 and the light receiving unit 31 are arranged in the vertical direction, for example, in the mounted state on a vehicle. The light emitting unit 11 is arranged so that the light projecting lens system 15 faces the optical window portion 654. The light receiving unit 31 is arranged so that the condenser lens system 41 faces the optical window portion 654.

The scanning unit 621 of the sixth embodiment is not configured to change the optical path of the light emitting unit and the light receiving unit, which are fixed, by the movable optical member. The scanning unit 621 is configured to scan the laser light LL from the light emitting unit 11 and the reflected light RL received by the light receiving unit 31 by changing the orientation of the light emitting/receiving body 630 itself by rotational motion or reciprocating motion. The scanning unit 621 includes a motor 622 that rotates or reciprocates the light emitting/receiving body 630 around the rotation axis RA that penetrates the light emitting unit 11 and the light receiving unit 31 along the generatrix direction of the cylindrical housing 651.

Figure 21:
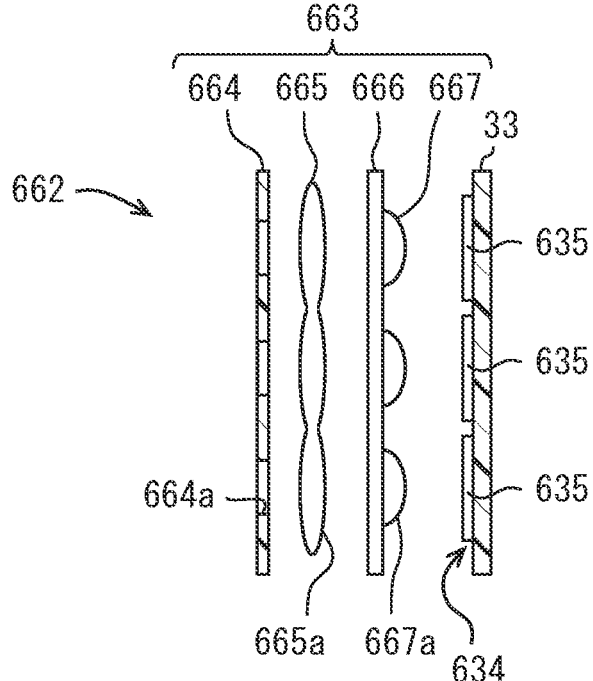
FIG. 21 is a cross-sectional view illustrating a detection element unit according to the sixth embodiment.

As shown in FIG. 21, the detection element unit 662 of the sixth embodiment has an incident adjustment unit 663 in addition to the detection element 33 and the light receiving control unit 36 using the same SPAD as in the first embodiment. The incident adjustment unit 663 adjusts the incident state of the reflected light RL incident on each pixel 635 of the detection element 33 to expand the dynamic range and enhance the performance of detecting each pixel 635. The incident adjustment unit 663 includes an aperture array 664, a lens array 665, a bandpass filter 666, and a diffusion filter 667. In the present embodiment, the aperture array 664, the lens array 665, the bandpass filter 666, and the diffusion filter 667 are arranged in this order from the condenser lens system 41 toward the detection element 33.

The aperture array 664 has a light-shielding portion formed in a flat plate shape having a light-shielding property, for example, made of a synthetic resin, and plural openings 664a opened in the light-shielding portion. The number of the openings 664a are, for example, the same as the number of pixels so as to respectively correspond to the pixels 635. The openings 664a are arranged at substantially the same interval as the arrangement interval PT of the pixels 635, corresponding to the arrangement of the pixels 635. The aperture array 664 reduces noise incident on the detection element 33 by blocking stray light that is obliquely incident on the light receiving unit 31 from a direction different from the irradiation direction of the laser light LL, outside the device.

The lens array 665 is arranged between the aperture array 664 and the bandpass filter 666. The lens array 665 has the same number of microlenses 665a as the number of openings 664a so as to respectively correspond to the openings 664a. The microlenses 665a are arranged at substantially the same interval as the arrangement interval PT of the pixels 635. Each microlens 665a collimates the reflected light RL that passes through the corresponding opening 664a.

The bandpass filter 666 is arranged between the lens array 665 and the diffusion filter 667. The bandpass filter 666 is formed in a thin plate shape, for example, and blocks light having a wavelength that does not need to be detected, that is, noise of the light transmitted through the lens array 665, other than the reflected light RL. As a result, the detection accuracy of the reflected light RL by the detection element 33 is improved. The bandpass filter 666 has a passband that transmits light toward the detection element 33 so as to include the entire assumed range of wavelength fluctuation.

The diffusion filter 667 is arranged so as to face the detection surface 634 of the detection element 33. The diffusion filter 667 diffuses the reflected light RL transmitted through the bandpass filter 666. The diffusion filter 667 may be formed in a flat plate shape by dispersing diffusion particles such as microbeads on a substrate made of, for example, a translucent synthetic resin or glass.

The diffusion filter 667 may have the same number of diffusion elements 667a as the number of pixels 635 arranged, for example, on the surface of the bandpass filter 666 facing the detection element 33 so as to respectively correspond to the pixels 635. Each diffusion element 667a is formed in a lenticular shape, for example, and diffuses the reflected light RL by dispersing diffuse particles such as microbeads on a substrate made of a translucent synthetic resin or glass, or by forming the surface in a rough surface.

The diffusion angle may be set for each diffusion element 667a so that the reflected light RL collimated by the microlens 665a is diffused according to the size of one pixel. The diffusion angle may be set for each diffusion element 667a so that the reflected light RL collimated by the microlens 665a is diffused according to the size of one SPAD. That is, it is preferable that only the reflected light RL that has passed through the corresponding opening 664a is incident on a corresponding certain pixel 635. In other words, the certain pixel 635 is suppressed from incident of reflected light RL passing through the opening 664a corresponding to another pixel 635 adjacent to the certain pixel 635. In FIG. 21, only three sets of the pixel 635, the diffusion element 667a, the microlens 665a, and the opening 664a are shown, but in reality, this set is provided for the number of pixels.

Figure 22:
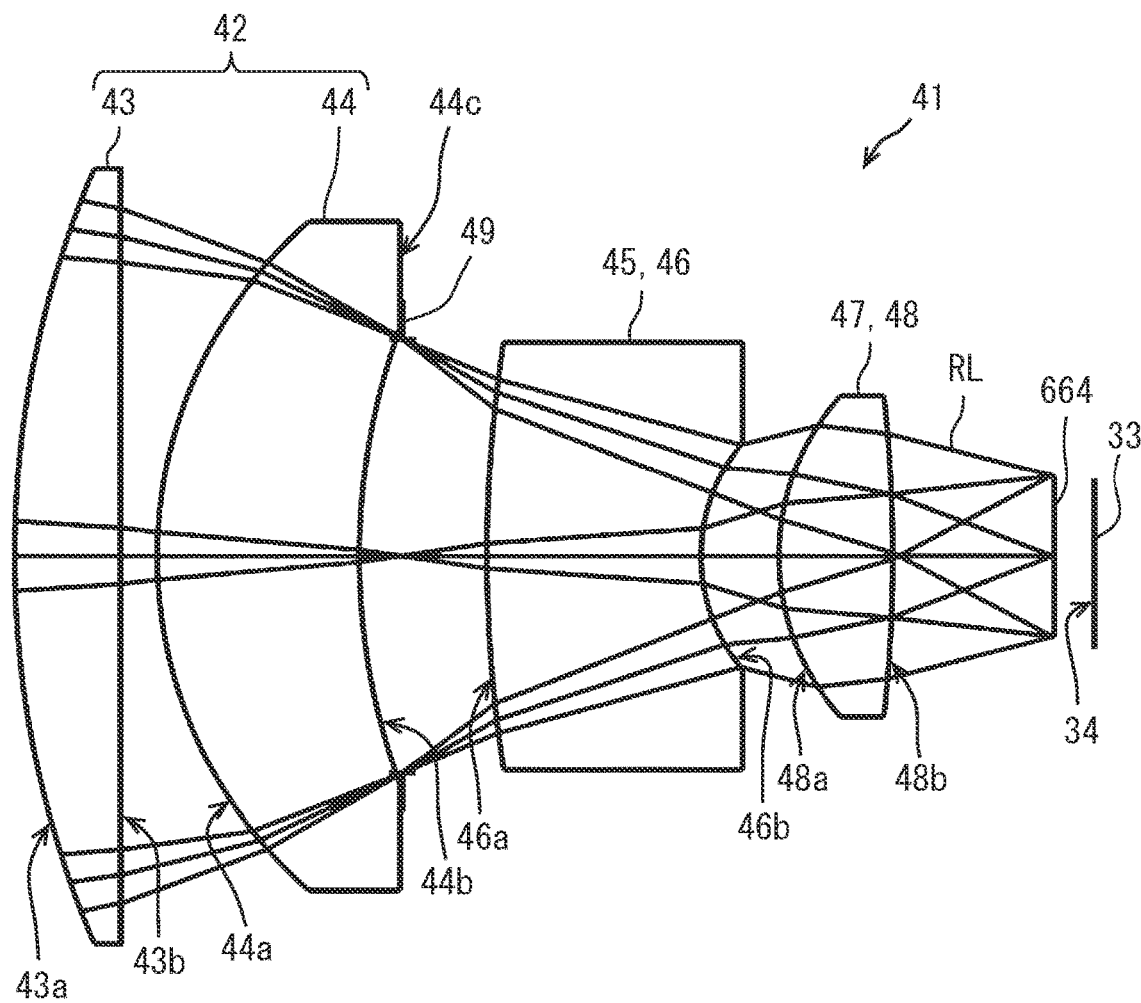
FIG. 22 is an optical path diagram of a condenser lens system according to the sixth embodiment.

As shown in FIG. 22, corresponding to the incident adjustment unit 663, the condenser lens system 41 of the sixth embodiment is placed to be focused on the aperture array 664 instead of on the detection surface 634 of the detection element 33. More specifically, the condenser lens system 41 of the sixth embodiment is arranged so that the rear focal point is aligned with the aperture array 664 rather than on the detection surface 634 of the detection element 33. The condenser lens system 41 is an optical system that is athermalized as in the first embodiment. Therefore, it is possible to avoid a situation in which the reflected light RL is largely defocused with respect to the aperture array 664.

According to the sixth embodiment, in the condenser lens system 41, the light is focused on the aperture array 664 arranged between the condenser lens system 41 and the detection element 33. That is, the reflected light RL is efficiently focused on the openings 664a formed in the aperture array 664, respectively corresponding to the pixels 635 of the detection element 33. Therefore, it is possible to suppress the stray light from being incident on the detection element 33 by the aperture array 664, and to secure the amount of reflected light RL that passes through the aperture 664a and is incident on the pixel 635.

Other Embodiments

Although multiple embodiments have been described above, the present disclosure is not construed as being limited to these embodiments, and can be applied to various embodiments and combinations within a scope that does not depart from the gist of the present disclosure.

Specifically, as a modification 1, plural light emitting units 11 may be provided. For example, plural pairs of the laser emitting element 13 and the projecting lens system 15 may be provided, and the pairs may be arranged in parallel. The substrate on which the laser emitting element 13 is mounted may be shared among the pairs. The lens barrel of the projecting lens system 15 may be shared among the pairs. However, it is preferable that the wavelength fluctuation assumption range of the laser light LL emitted by the laser emitting element 13 is the same among the pairs.

As a modification 2, the laser light LL emitted by the light emitting unit 11 does not have to be shaped into a beam having a line-shaped spot form. The spot shape of the laser light LL may be various shapes such as circle or ellipse.

As a modification 3, an optical element such as plane mirror or polygon mirror may be adopted as the movable optical member in the scanning unit 21.

As a modification 4, the number of lens groups in the condenser lens system 41 and the number of lenses belonging to each lens group can be appropriately changed. The same applies to the projecting lens system 15. When a lens group is added, it is preferable that the influence of the additional lens group on the temperature change factor TF and the chromatic aberration factor CF is sufficiently smaller than that of the basic lens group. When a lens is added to a specific lens group, the effect of the additional lens on the temperature change factor TF and the chromatic aberration factor CF tends to be the same as the lenses belonging to the same lens group due to the adoption of the same optical material or similar glass material. It is preferable that the influence itself is sufficiently small for lenses belonging to the same lens group.

As a modification 5, when plural lenses belong to the same lens group in the condenser lens system 41, the optical material may be different among the plural lenses while satisfying the parameter relations (specifically, the magnitude relation of the Abbe number or the magnitude relation of the temperature differentiating value of the refractive index) with the optical material forming another lens group. The same applies to the projecting lens system 15.

As a modification 6, the condenser lens system 41 may include a lens in which two or more lenses are laminated and integrated. The condenser lens system 41 may include a diffracting lens that diffracts the reflected light RL. The same applies to the projecting lens system 15.

As a modification 7, the condenser lens system 41 may further include a bandpass filter. The bandpass filter blocks a part of the light incident on the condenser lens system 41 other than the reflected light, that is, noise. As a result, the detection accuracy of the reflected light RL by the detection element 33 is improved. The bandpass filter has a band for transmitting light toward the detection element 33, and the band includes all of the assumption range of the wavelength fluctuation.

As a modification 8, the detection element 33 may be formed of, for example, a glass material or a synthetic resin material, and may be covered with a thin plate-shaped translucent cover having translucency.

As a modification 9 to the third to fifth embodiments, the adjustment lens such as the positive lens 316a and the cylindrical lens 317a is made of the optical material having normal dispersion characteristics such as dnx/dt<0 and/or dny/dt<0. In this case, the temperature change factor TF makes the optical power of the entire lens system smaller at high temperature than at low temperature, but the optical path length becomes long by setting the center thickness of the adjustment lens sufficiently larger than the center thickness of the positive lens 316a. Therefore, even under this condition, the adjustment lens has a function of adjusting the focal position. Therefore, the temperature change factor TF and the chromatic aberration factor CF can be balanced. Further, when the positive lens 316a and the adjustment lens satisfy dnx/dt<0 and/or dny/dt<0, an optical material having an abnormal dispersion characteristic may be set in the positive lens 316a.

As a modification 10 to the fifth embodiment, a toroidal lens may be provided instead of the cylindrical lens 517a.

The toroidal lens has a negative power in the fast axis/optical axis plane FP. The toroidal lens has a negative optical power in the slow axis/optical axis plane SP, which is shifted in the positive direction from the optical power in the fast axis/optical axis plane FP. For example, one of the front and rear refracting surfaces of the toroidal lens is formed in a toroidal plane, and the other is formed in a planar shape.

As a modification 11 to the sixth embodiment, the openings 664a of the aperture array 664 may be provided for one pixel while individually corresponding to the pixels 635. For example, four openings 664a may be arranged and formed in a grid pattern for one pixel. In this case, one microlens 665a and one diffusion element 667a may be provided for one pixel, or the same number of microlenses 665a and diffusion elements 667a may be provided as the openings 664a.

As a modification 12 to the sixth embodiment, an additional lens array may be adopted in the incident adjustment unit 663 instead of the aperture array 664. In this case, the condenser lens system 41 may be arranged so as to be focused on the additional lens array. Alternatively, the condenser lens system 41 may be arranged so as to be focused on the main plane of the lens system formed by the additional lens array and the lens array 665. Further, the incident adjustment unit 663 may not be provided with the aperture array 664, and the condenser lens system 41 may be arranged so as to be focused on the main plane of the lens array 665.

As a modification 13, when the chromatic aberration factor CF balances with the temperature change factor TF, the amount of focal movement may be suppressed as a result of canceling the chromatic aberration factor CF and the temperature change factor TF. In this case, the light emitting surface 13c, the detection surface 634, or the aperture array 664, which is the focus target surface of the lens system 15, 41, can be maintained within the range of the depth of focus near the focal point of the lens system 15, 41. In this sense, it is possible to positively utilize the thickness of the lens whose optical power is zero or negative for the temperature change factor TF of the optical material to change the optical path length in the medium with respect to the temperature change.

That is, the temperature change factor TF of the optical material can be a factor that causes the focal point of the lens system 15, 41 to be separated from the lens system 15, 41 at a high temperature than at a low temperature. Similarly, the chromatic aberration factor CF can be a factor that brings the focal point of the lens system 15, 41 closer to the lens system at a long wavelength than at a short wavelength.

As a modification 14, the assumed range of temperature change may be a range corresponding to the assumed vehicle-mounted environment. For example, the assumed range of temperature change may have the lower limit which is the annual minimum temperature and the upper limit which is the annual maximum temperature observed in the previous year in the sales area of the vehicle on which the optical detector 10 is mounted.

The present disclosure also includes the following technical concepts based on the above embodiments.

An optical detector configured to be used in an environment with temperature change includes:

a light emitting unit (11) that emits a laser light (LL) having a temperature dependence on a peak wavelength to shift to a longer wavelength side as a temperature rises; and a light receiving unit (31) that receives a reflected light (RL) which is the laser light reflected by a measurement object (1).

The light receiving unit includes a detection element (33) that detects the reflected light, and a condenser lens system (41, 241) that collects the reflected light to the detection element, the condenser lens system having a plurality of lenses (43, 44, 46, 48, 243, 245) made of optical material and having a positive optical power as a whole.

The condenser lens system has, as a factor to change the focal position of the condenser lens system, a temperature change factor (TF) in the optical material, to cause the focus of the condenser lens system to move away from the condenser lens system at a high temperature than at a low temperature, and a chromatic aberration factor (CF) that brings the focal point of the condenser lens system closer to the condenser lens system at a long wavelength than at a short wavelength.

The optical power of each of the plurality of lenses is adjusted based on a correspondence between a change in temperature and a shift amount of the peak wavelength, so that the chromatic aberration factor balances with the temperature change factor within a wavelength range where a shift of the peak wavelength is assumed.

Accordingly, the chromatic aberration that shifts the focus to the rear at a long wavelength is set to cancel the shift of the focus to the front due to the optical material based on a correspondence relation between the amount of temperature change and the shift of the peak wavelength. Therefore, the light condensing state on the detection element is maintained even when the temperature changes. Since the reflected light can be efficiently collected on the detection element, the sensitivity of the detection element to detect the reflected light and the detection performance can be maintained in a high state.

An optical detector configured to be used in an environment with temperature change includes:

a light emitting unit (11) that emits a laser light (LL) having a temperature dependence on a peak wavelength to shift to a longer wavelength side as a temperature rises; and a light receiving unit (31) that receives a reflected light (RL) which is the laser light reflected by a measurement object (1).

The light emitting unit includes a laser emitting element (13) that emits the laser light, and a projecting lens system (315) having a plurality of lenses (316a, 317a, 416a, 417a, 516a, 517a) formed of an optical material, to project the laser light toward the measurement object (1), the optical power of the entire lens system being positive.

The projecting lens system has, as a factor to change the focal position, a temperature change factor (TF) in the optical material to cause the focus of the projecting lens system to move away from the projecting lens system at a high temperature than at a low temperature, and a chromatic aberration factor (CF) that brings the focal point of the projecting lens system closer to the projecting lens system at a long wavelength than at a short wavelength.

The optical power of each of the plurality of lenses is adjusted based on a correspondence between a change in temperature and a shift amount of the peak wavelength, so that the chromatic aberration factor balances with the temperature change factor within a wavelength range where a shift of the peak wavelength is assumed.

Accordingly, the chromatic aberration that shifts the focus to the front at a long wavelength is set to cancel the shift of the focus to the rear due to the optical material based on a correspondence relation between the amount of temperature change and the shift of the peak wavelength. Therefore, the focus state on the laser emitting element is maintained even when the temperature changes. Since the intended spot shape of the projected laser light is maintained, it is possible to effectively project the light to the measurement object. Thus, the detection performance of the measurement object using the reflected light can be maintained in a high state.

An optical detector configured to be used in an environment with temperature change includes:

a light emitting unit (11) that emits a laser light (LL) having a temperature dependence on a peak wavelength to shift to a longer wavelength side as a temperature rises; and a light receiving unit that receives a reflected light (RL) which is the laser light reflected by a measurement object (1).

The light emitting unit includes a laser emitting element (13) that emits the laser light, and a projecting lens system (315) having a plurality of lenses (316a, 317a, 416a, 417a, 516a, 517a) formed of an optical material, to project the laser light toward the measurement object (1), the optical power of the entire lens system being positive.

The projecting lens system includes a main lens group (316) including at least one positive lens (316a, 416a, 516a) of the plurality of lenses, and an adjustment lens group (317) including an adjustment lens (317a, 417a, 517a) having an optical power smaller than or equal to zero in the fast axis/optical axis plane, the adjustment lens being at least a part of the plurality of lenses excluding the main lens group.

The adjustment lens group is arranged between the main lens group and the laser emitting element.

Accordingly, the optical path length of the light ray passing through the medium of the adjustment lens can be changed with respect to the temperature change. Therefore, the adjustment lens can cancel the deviation of the focal position due to the action of chromatic aberration in the positive lens with respect to the peak wavelength that shifts with the temperature change. Therefore, it becomes easy to keep the laser emitting element in focus even with respect to the temperature change. Since the intended spot shape of the projected laser light can be maintained, the light can be effectively projected on the measurement object. Therefore, the detection performance of the measurement object by the reflected light reflected by the measurement object can be maintained in a high state.

Although the present disclosure has been described in accordance with the embodiments, it is understood that the present disclosure is not limited to the embodiment and the structure. The present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. An optical detector comprising:

a light emitting unit that emits a laser light having temperature dependence on a peak wavelength to shift to a longer wavelength side as a temperature rises; and a light receiving unit that receives a reflected light which is the laser light reflected by a measurement object, wherein the light receiving unit has a detection element that detects the reflected light, and a condenser lens system that collects the reflected light to the detection element, the condenser lens system having a plurality of lenses made of optical material and having a positive optical power as a whole, the condenser lens system having a temperature change factor that increases the optical power as a whole of the condenser lens system at a high temperature than at a low temperature lower than the high temperature, in the optical material with respect to the reflected light, and a chromatic aberration factor that decreases the optical power as a whole of the condenser lens system at a long wavelength than at a short wavelength shorter than the long wavelength, and the optical power of each of the plurality of lenses is adjusted based on a correspondence between a change in temperature and a shift amount of the peak wavelength, so that the chromatic aberration factor balances with the temperature change factor within a wavelength range where a shift of the peak wavelength is assumed, wherein the condenser lens system has a first lens group including at least one positive lens which is a part of the plurality of lenses, and a second lens group including at least one negative lens which is a part of the plurality of lenses excluding the lens belonging to the first lens group, the optical material forming the negative lens has a dispersion characteristic that is higher in dispersion than the optical material forming the positive lens, and the optical material forming the negative lens has temperature dependence in a refractive index, in which differentiating value of the refractive index with respect to temperature is higher in the optical material forming the negative lens than in the optical material forming the positive lens.

2. The optical detector according to claim 1, wherein the optical power is distributed between the lenses made of optical materials having temperature dependence in a refractive index, in which differentiating values of the refractive index with respect to temperature are different from each other.

3. The optical detector according to claim 1, wherein the second lens group is arranged between the first lens group and the detection element.

4. The optical detector according to claim 1, wherein the second lens group is arranged on an opposite side of the detection element through the first lens group.

5. The optical detector according to claim 1, wherein the condenser lens system includes a third lens group that corrects a distortion of the condenser lens system caused by a combination of the first lens group and the second lens group, the third lens group has at least one correction lens which is a part of the plurality of lenses excluding the first lens group and the second lens group, and the optical material forming the correction lens has temperature dependence in a refractive index, in which differentiating value of the refractive index with respect to temperature is smaller in the optical material forming the correction lens than in the optical material forming the positive lens.

6. The optical detector according to claim 5, wherein
the detection element has a plurality of pixels arranged at
   a predetermined arrangement interval on a detection
   surface, and
the distortion corrected by the third lens group is set
   within a range such that a deviation amount of an actual
   imaging position of the condenser lens system with
   respect to an ideal imaging position where an image
   shaping condition is satisfied on the detection surface is
   smaller than the arrangement interval.

7. The optical detector according to claim 1, wherein
the detection element has a plurality of pixels arranged on
   a detection surface,
the optical detector further comprises an aperture array
   disposed between the condenser lens system and the
   detection element, the aperture array having a plurality
   of openings respectively corresponding to the plurality
   of pixels, and
the condenser lens system is arranged so as to be focused
   on the aperture array.

8. An optical detector comprising:
a light emitting unit that emits a laser light having
   temperature dependence on a peak wavelength to shift
   to a longer wavelength side as a temperature rises; and
a light receiving unit that receives a reflected light which
   is the laser light reflected by a measurement object,
   wherein
the light emitting unit includes
   a laser emitting element that emits the laser light, and
   a projecting lens system to project the laser light to the
     measurement object, the projecting lens system hav-
     ing a plurality of lenses formed of an optical material
     and having a positive optical power as an entire lens
     system,
the projecting lens system has a temperature change factor
   in the optical material that increases the optical power
   of the entire lens system at a high temperature than at
   a low temperature lower than the high temperature and
   a chromatic aberration factor that makes the power of
   the entire lens system smaller at a long wavelength than
   at a short wavelength shorter than the long wavelength,
   the projecting lens system changing the optical power
   of the entire lens system with respect to the laser light,
   and
the optical power of each of the plurality of lenses is
   adjusted based on a correspondence between a change
   in temperature and a shift amount of the peak wave-
   length, so that the chromatic aberration factor balances
   with the temperature change factor within a wavelength
   range where a shift of the peak wavelength is assumed,
   wherein
the laser emitting element has a fast axis direction and a
   slow axis direction orthogonal to each other, and an amount of focal movement within the wavelength
   range in a fast axis/optical axis plane as a cross section
   including an optical axis of the projecting lens system
   and the fast axis direction is smaller than an amount of
   focal movement within the wavelength range in a slow
   axis/optical axis plane as a cross section including the
   optical axis and the slow axis direction.

9. The optical detector according to claim 8, wherein
the projecting lens system has
   a main lens group including at least one positive lens of
     the plurality of lenses, and
   an adjustment lens group including an adjustment lens
     which has an optical power smaller than or equal to
     zero in the fast axis/optical axis plane, the adjust-
     ment lens being a part of the plurality of lenses
     excluding the main lens group.

10. The optical detector according to claim 8, wherein
the laser emitting element has a fast axis direction and a
   slow axis direction orthogonal to each other, and
the projecting lens system has
   a main lens group including at least one positive lens of
     the plurality of lenses, and
   an adjustment lens group including an adjustment lens
     which has an optical power smaller than or equal to
     zero in a fast axis/optical axis plane as a cross section
     including an optical axis of the projecting lens sys-
     tem and the fast axis direction, the adjustment lens
     being a part of the plurality of lenses excluding the
     main lens group.

11. The optical detector according to claim 10, wherein
in the adjustment lens, a difference between the optical
   power in the fast axis/optical axis plane and the optical
   power in a slow axis/optical axis plane as a cross
   section including the optical axis and the slow axis
   direction is negative.

12. The optical detector according to claim 9, wherein
in the adjustment lens, the optical power in the fast
   axis/optical axis plane is zero, and the optical power in
   the slow axis/optical axis plane is positive.

13. The optical detector according to claim 9, wherein
in the adjustment lens, the optical power in the fast
   axis/optical axis plane is negative and the optical power
   in the slow axis/optical axis plane is zero.

14. The optical detector according to claim 9, wherein
in the adjustment lens, the optical power in the fast
   axis/optical axis plane is negative and the optical power
   in the slow axis/optical axis plane is negative.

15. The optical detector according to claim 9, wherein
the adjustment lens group is arranged between the main
   lens group and the laser emitting element.

* * * * *